United States Patent
Shen et al.

(10) Patent No.: US 9,975,312 B2
(45) Date of Patent: May 22, 2018

(54) MOLDED ARTICLE HAVING ENHANCED AESTHETIC EFFECT AND METHOD AND SYSTEM FOR MAKING THE MOLDED ARTICLE

(71) Applicants: Qingya Shen, Shanghai (CN); Xin Kong, Shanghai (CN); Shipu Cao, Shanghai (CN); Narong An, Shanghai (CN); Jong-Min Choi, Sungnam (KR); Shengping Pan, Shanghai (CN)

(72) Inventors: Qingya Shen, Shanghai (CN); Xin Kong, Shanghai (CN); Shipu Cao, Shanghai (CN); Narong An, Shanghai (CN); Jong-Min Choi, Sungnam (KR); Shengping Pan, Shanghai (CN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 560 days.

(21) Appl. No.: 14/024,000

(22) Filed: Sep. 11, 2013

(65) Prior Publication Data

US 2014/0170397 A1    Jun. 19, 2014

Related U.S. Application Data

(62) Division of application No. 13/215,461, filed on Aug. 23, 2011, now Pat. No. 8,557,158.

(51) Int. Cl.

| | |
|---|---|
| *B32B 27/06* | (2006.01) |
| *B32B 7/02* | (2006.01) |
| *B29C 45/16* | (2006.01) |
| *B29C 45/00* | (2006.01) |
| *C08L 67/02* | (2006.01) |
| *B29K 67/00* | (2006.01) |
| *B29K 69/00* | (2006.01) |
| *B29C 45/14* | (2006.01) |

(52) U.S. Cl.
CPC ............ *B32B 7/02* (2013.01); *B29C 45/0001* (2013.01); *B29C 45/14778* (2013.01); *B29C 45/1671* (2013.01); *B32B 27/06* (2013.01); *C08L 67/02* (2013.01); *B29C 45/14434* (2013.01); *B29K 2067/00* (2013.01); *B29K 2069/00* (2013.01); *Y10T 428/24942* (2015.01); *Y10T 428/252* (2015.01); *Y10T 428/31507* (2015.04)

(58) Field of Classification Search
CPC ...... C08F 290/061; C08L 69/00; C08L 67/02; C08L 2666/18; C08L 25/14; C08L 2666/14; C08L 67/00; C08L 33/12; C08L 2205/03; B29C 45/1418; B29C 45/1671; B29C 2045/14237; B32B 27/365; B32B 27/36; B32B 27/06
USPC ................... 428/412, 480; 525/439; 526/326
See application file for complete search history.

(56) References Cited

U.S. PATENT DOCUMENTS

| | | |
|---|---|---|
| 2,465,319 A | 3/1949 | Whinfield et al. |
| 2,720,502 A | 10/1955 | Caldwell |
| 2,727,881 A | 12/1955 | Caldwell et al. |
| 2,822,348 A | 2/1958 | Haslam |
| 2,999,835 A | 9/1961 | Goldberg |
| 3,038,365 A | 6/1962 | Peterson |
| 3,047,539 A | 7/1962 | Pengilly |
| 3,153,008 A | 10/1964 | Fox |
| 3,334,154 A | 8/1967 | Kim |
| 3,635,895 A | 1/1972 | Kramer |
| 3,671,487 A | 6/1972 | Abolins |
| 3,808,180 A | 4/1974 | Owens |
| 3,953,394 A | 4/1976 | Fox et al. |
| 4,001,184 A | 1/1977 | Scott |
| 4,096,202 A | 6/1978 | Farnham et al. |
| 4,123,436 A | 10/1978 | Holub et al. |
| 4,128,526 A | 12/1978 | Borman |
| 4,131,575 A | 12/1978 | Adelmann et al. |
| 4,180,494 A | 12/1979 | Fromuth et al. |
| 4,204,047 A | 5/1980 | Margotte et al. |
| 4,260,693 A | 4/1981 | Liu |

(Continued)

FOREIGN PATENT DOCUMENTS

| | | |
|---|---|---|
| CN | 1891755 A | 1/2007 |
| EP | 1734076 B1 | 7/2008 |

(Continued)

OTHER PUBLICATIONS

Japanese Patent No. 2011131421 (A); Publication Date: Jul. 7, 2011; Abstract Only; 2 Pages.

(Continued)

*Primary Examiner* — Callie Shosho
*Assistant Examiner* — Krupa Shukla
(74) *Attorney, Agent, or Firm* — Cantor Colburn LLP

(57) ABSTRACT

A molded article, comprises: an insert comprising metal, glass, and combinations comprising at least one of the foregoing; a composition injection molded in a first shot on at least a portion of the insert forming a part; and a thermoplastic material injection molded on at least a portion of the part in a second shot of a double shot process. The composition comprises: a) an aromatic polycarbonate (PC) and poly(1,4-cyclohexane dimethylene 1,4-cyclohexanedicarboxylate) (PCCD), the weight ratio of PC to PCCD being in the range of 30 to 90 PC to 70 to 10 PCCD, b) glass fiber greater than or equal to 0.75 mm in length and the quantity of glass fiber from 1 to 50 wt. % of the composition, and c) the refractive index of the polycarbonate and PCCD closely matching the refractive index of the glass fiber and being in the range of from 1.540 to 1.570.

20 Claims, 9 Drawing Sheets

(56) References Cited

U.S. PATENT DOCUMENTS

| | | |
|---|---|---|
| 4,565,684 A | 1/1986 | Tibbetts et al. |
| 4,572,813 A | 2/1986 | Arakawa |
| 4,663,230 A | 5/1987 | Tennent |
| 4,816,289 A | 3/1989 | Komatsu et al. |
| 4,876,078 A | 10/1989 | Arakawa et al. |
| 5,024,818 A | 6/1991 | Tibbetts et al. |
| 5,039,566 A | 8/1991 | Skubic et al. |
| 5,165,909 A | 11/1992 | Tennent et al. |
| 5,589,152 A | 12/1996 | Tennent et al. |
| 5,591,382 A | 1/1997 | Nahass et al. |
| 5,665,450 A | 9/1997 | Day et al. |
| 6,455,110 B1 | 9/2002 | Fortuyn et al. |
| 6,458,913 B1 | 10/2002 | Honigfort et al. |
| 6,559,270 B1 | 5/2003 | Siclovan et al. |
| 6,627,303 B1 | 9/2003 | Gallucci et al. |
| 6,764,638 B1 | 7/2004 | Matsco et al. |
| 7,695,665 B2 | 4/2010 | Zadesky et al. |
| 7,697,269 B2 | 4/2010 | Yang et al. |
| 7,755,885 B2 | 7/2010 | Huang |
| 7,857,615 B2 | 12/2010 | Zha et al. |
| 2004/0018337 A1 | 1/2004 | Hus et al. |
| 2006/0017706 A1* | 1/2006 | Cutherell et al. ............ 345/173 |
| 2006/0287429 A1 | 12/2006 | Gaggar et al. |
| 2009/0009942 A1* | 1/2009 | Hsu et al. .................... 361/681 |
| 2009/0057952 A1 | 3/2009 | Choe et al. |
| 2009/0218725 A1 | 9/2009 | Thelemann et al. |
| 2010/0028640 A1 | 2/2010 | Isozaki et al. |
| 2010/0256279 A1 | 10/2010 | Isozaki et al. |
| 2011/0021678 A1 | 1/2011 | Isozaki et al. |
| 2011/0076883 A1 | 3/2011 | Jol |
| 2011/0134012 A1 | 6/2011 | Yang et al. |

FOREIGN PATENT DOCUMENTS

| | | |
|---|---|---|
| GB | 2037087 A | 7/1980 |
| JP | 2011131421 A | 7/2011 |
| KR | 20100012787 A | 2/2010 |
| WO | 0232999 A2 | 4/2002 |

OTHER PUBLICATIONS

International Search Report for International Application PCT/IB2012/054209; International Filing Date Aug. 20, 2012; dated Mar. 19, 2013; 7 pages.

Written Opinion of the International Search Report for International Application PCT/IB2012/054209; International Filing Date Aug. 20, 2012; dated Mar. 19, 2013; 11 pages.

Chinese Patent No. 1891755 (A); Publication Date: Jan. 10, 2007; Machine Translation; 21 Pages.

European Search Report for European Application No. 16188614.8; Date of Completion: Dec. 1, 2016; dated Dec. 13, 2016; 9 Pages.

* cited by examiner

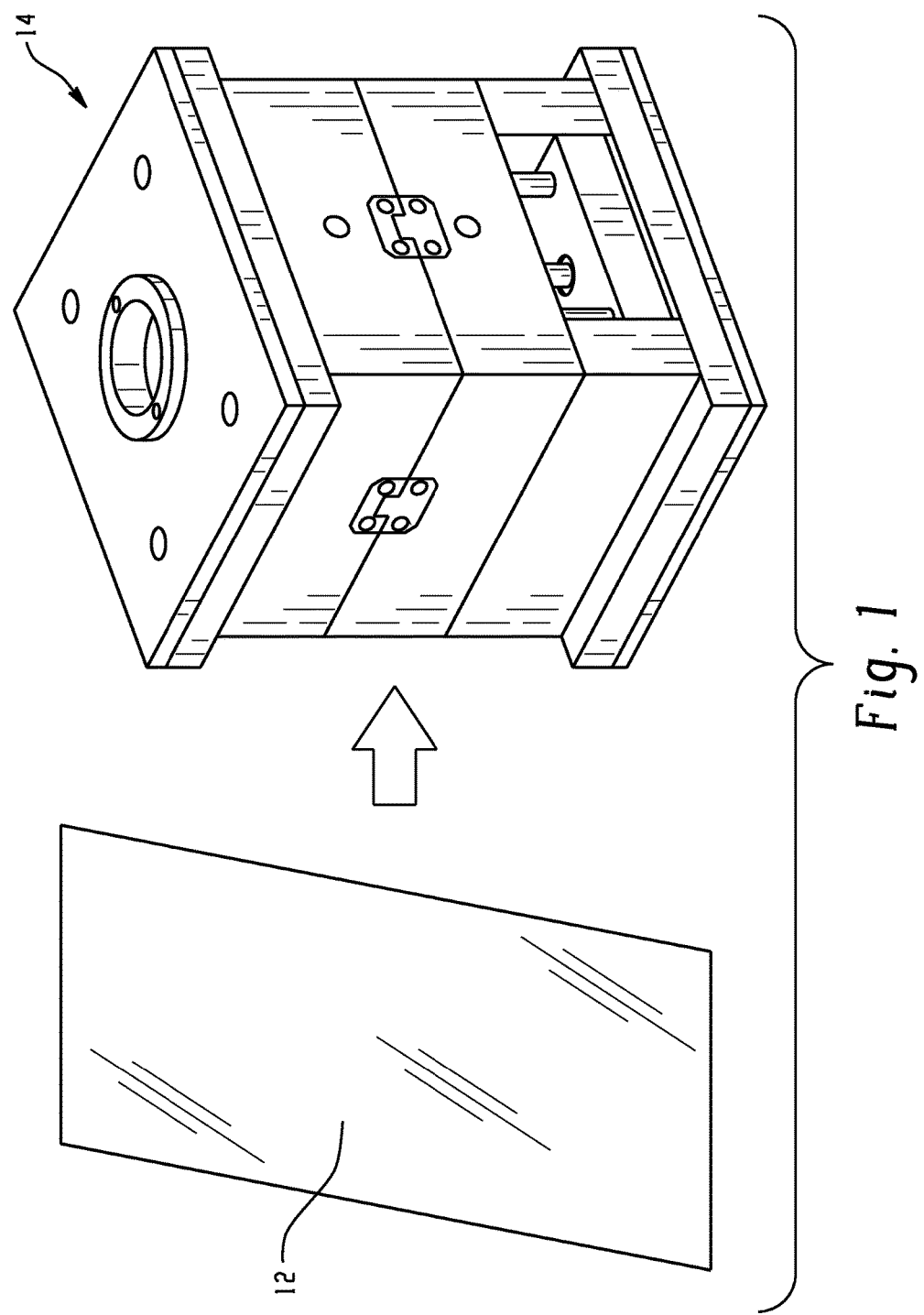

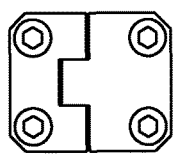
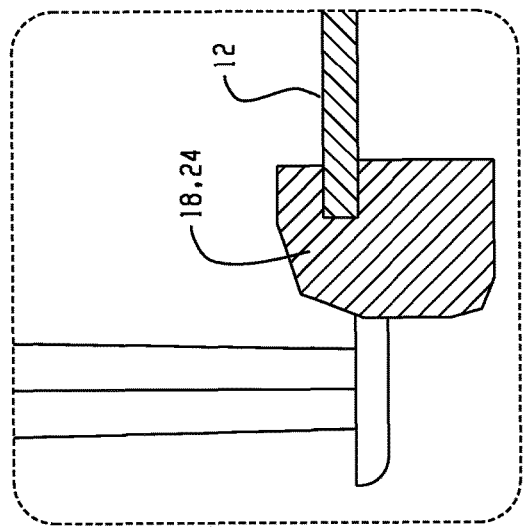
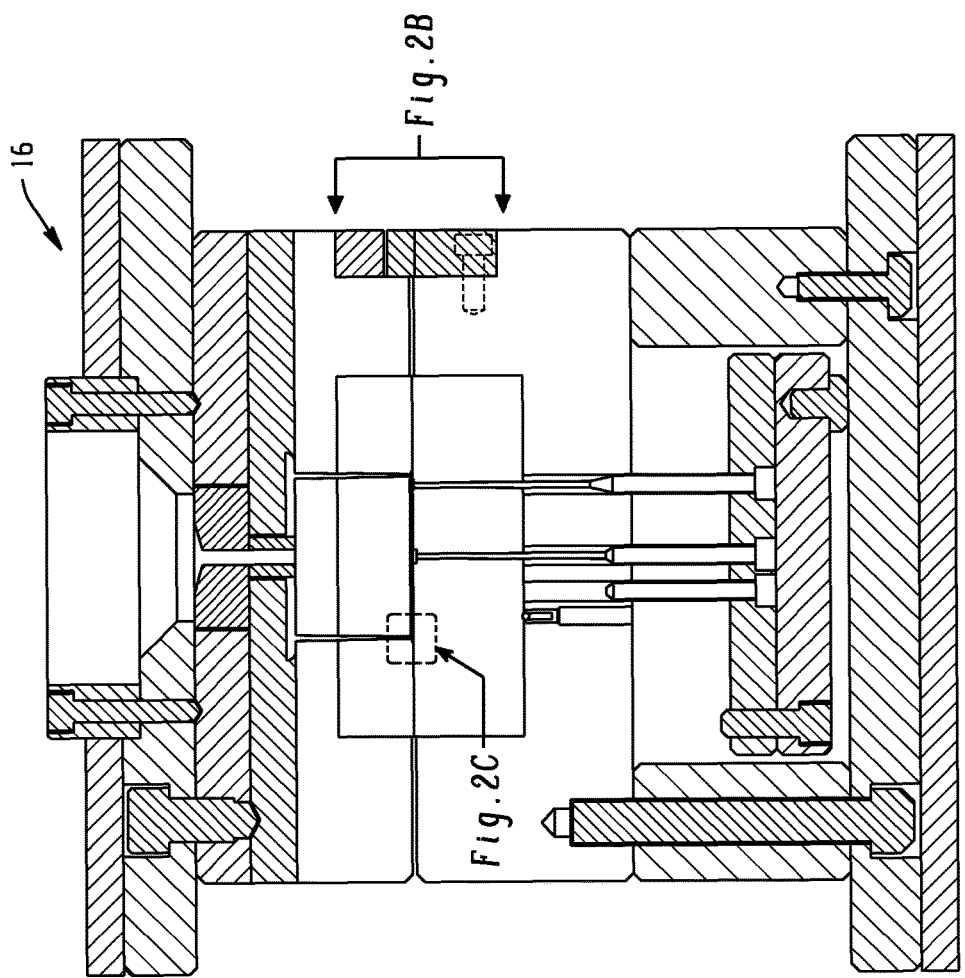

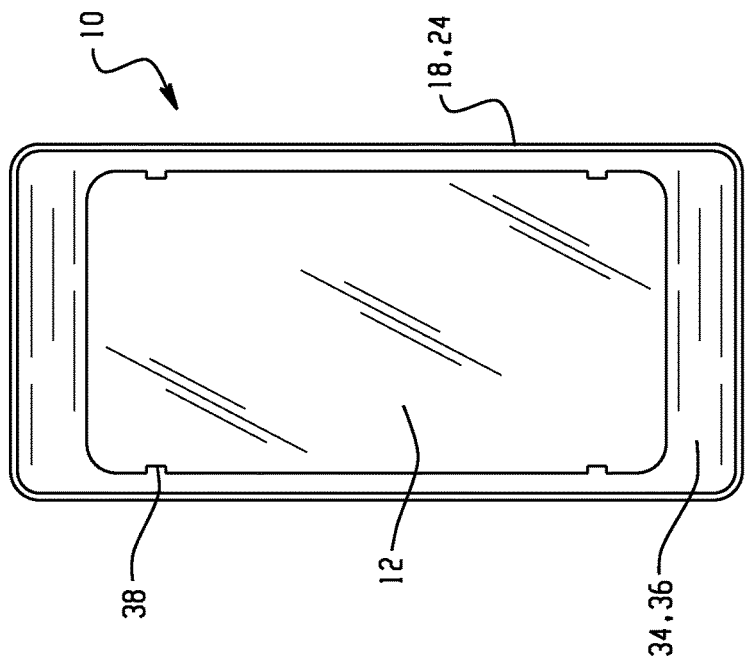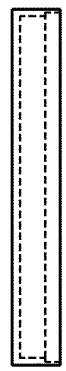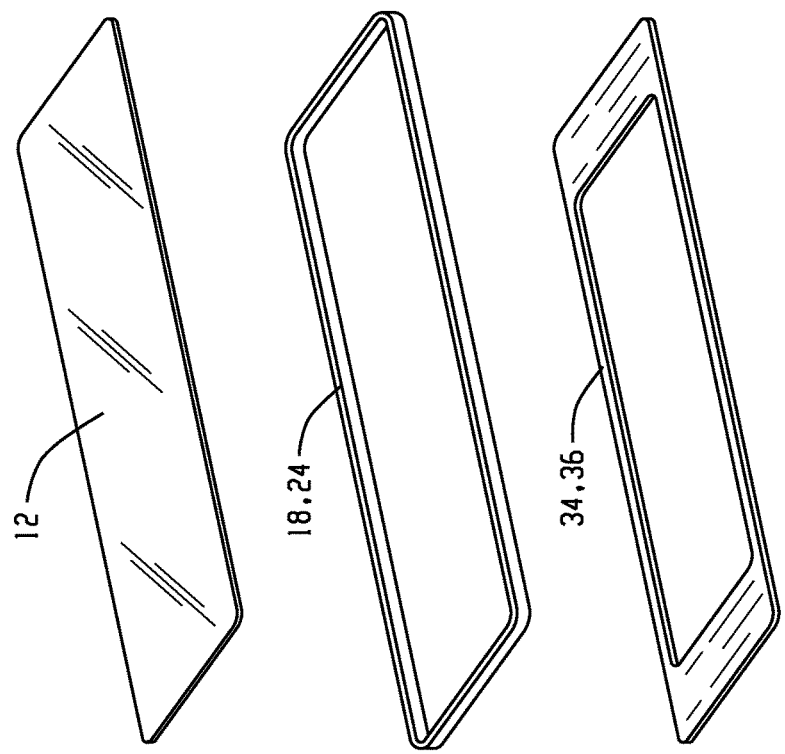
Fig. 3B
Fig. 3C
Fig. 3A

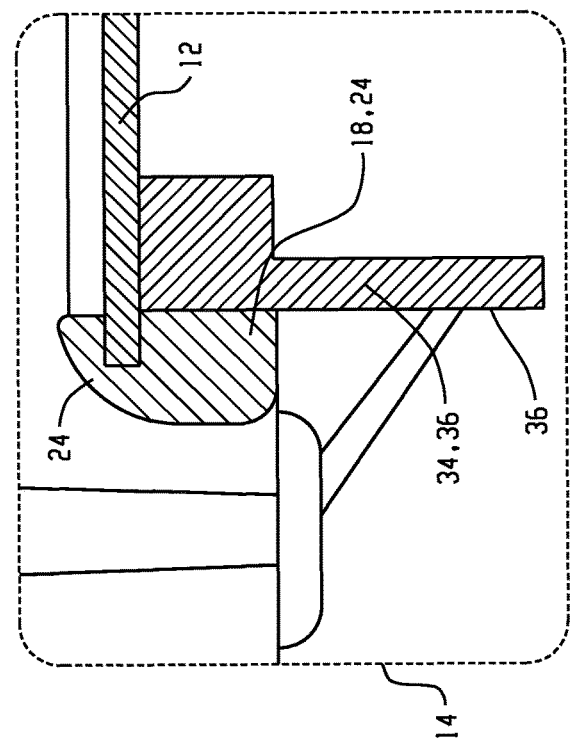
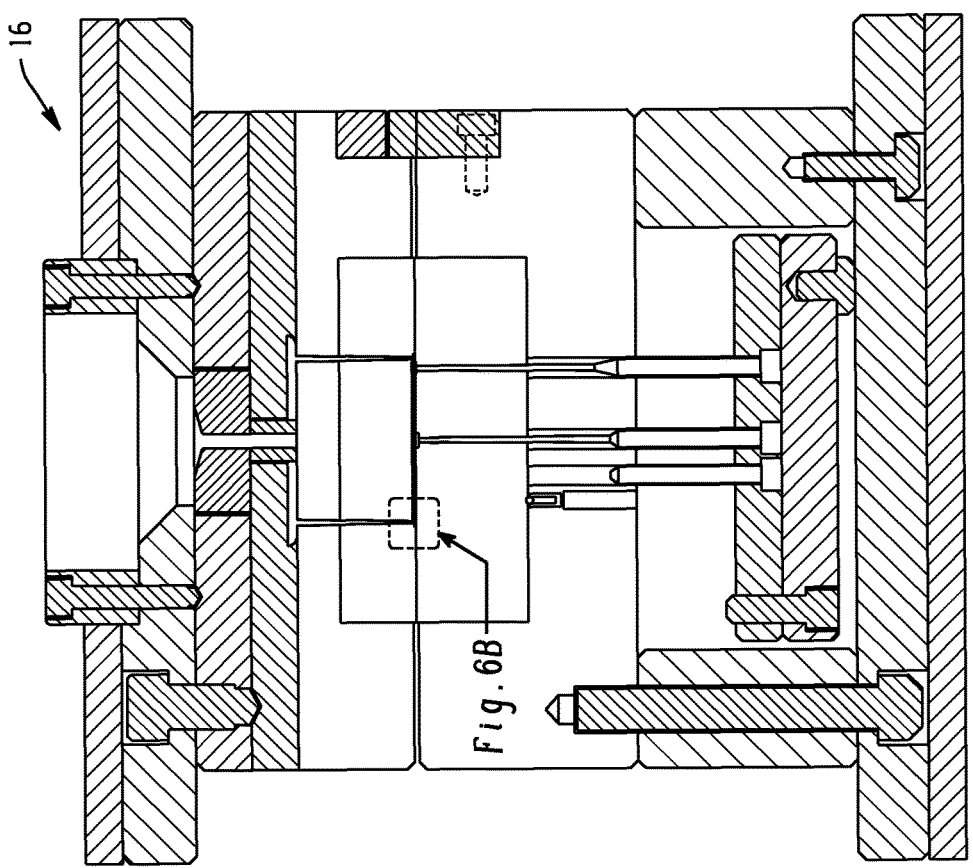
Fig. 6B
Fig. 6A

MOLDED ARTICLE HAVING ENHANCED AESTHETIC EFFECT AND METHOD AND SYSTEM FOR MAKING THE MOLDED ARTICLE

CROSS REFERENCE TO RELATED APPLICATIONS

The present application is a Divisional of U.S. application Ser. No. 13/215,461, filed Aug. 23, 2011, now U.S. Pat. No. 8,557,158, the contents of which is incorporated herein by its entirety.

BACKGROUND

The present disclosure relates to molding processes to produce articles having enhanced aesthetic effect, and to articles produced by such methods. More particularly, the present disclosure relates to molding processes to produce parts for electronic devices having enhanced aesthetic effect, such as multi-color thermoplastic parts for electronic devices, and to the parts produced by such methods.

There are many different types of molding processes. For example, injection molding is a process for manufacturing products made of plastic. In general, molten plastic material is injected into a mold and the material solidifies upon cooling. The molded product of desired shape then can be removed from the mold for use.

U.S. Pat. No. 7,857,615 discloses an injection mold having a plurality of cavities and a runner system for injecting material into the cavities. The runner system includes a main-runner and a sub-runner. The sub runner interconnects the main-runner and the cavities. The sub-runner includes a first runner and a pair of second runners. The first runner connects the main-runner, and the second runners respectively connect ends of the first runner. A buffer region is formed around a point of the first runner and each second runner for mixing material when the material flows from the first runner into the second runners to make the material have a symmetric speed distribution in the second runners.

In insert molding, in general, an insert is located in a mold and the material of the remainder of an object being formed is formed at least partially around the insert. For instance, a metal core can be inserted into a mold to become part of the molded part or, alternatively, to leave its profile in the molded part. Insert molding also can include a custom-built mold that can be loaded with inserts. Molten material can then be injected into the mold around the inserts and, upon cooling, the mold can be opened and the components of desired shape removed, as described in U.S. Patent Publication No. 2009/0218725 A1.

Moreover, as further disclosed in U.S. Patent Publication No. 2009/0218725 A1, mobile device enclosures typically have a window panel or interface panel attached to an enclosure body by mechanical fasteners, glues, or mechanically welding by techniques such as sonic welding or heat-stacking. Thus, thick device enclosures can result from these methods. For example, where a touch sensitive panel is attached by a sonically welded bezel to an enclosure, the stacked structure can be thick in comparison to the thickness of the enclosed mobile device. Also, glues and mechanical attachments can fail thereby potentially exposing electronic components contained therein to damage or contamination.

BRIEF DESCRIPTION

Despite the above molding processes, there exists a continual need for efficient molding techniques compatible with a varied combination of materials to increase the aesthetic and visual effects of the produced articles, without causing cracking during production. This need is particularly evident in the electronics industry where the aesthetic and visual effects including size/thickness of a device, such as a mobile phone, can be just as important to the consumer as the technical functioning of the electronic device.

Embodiments disclosed herein address the above needs and others.

Disclosed herein are molded articles having enhanced aesthetic and visual effects and methods and systems for making such articles.

In some embodiments, a method for making a molded article comprises: locating an insert comprising metal, glass, and combinations comprising at least one of the foregoing, in a tooling of a double shot injection molding apparatus; and injecting by injection molding, in a first shot on at least a portion of the insert to form a part, a composition comprising: a) an aromatic polycarbonate (PC) and poly(1,4-cyclohexane dimethylene 1,4-cyclohexanedicarboxylate) (PCCD), the weight ratio of PC to PCCD being in the range of 30 to 90 PC to 70 to 10 PCCD, b) glass fiber greater than or equal to 0.75 millimeters (mm) in length and the quantity of glass fiber from 1 to 50 wt. % of the composition, and c) the refractive index of the polycarbonate and PCCD closely matching the refractive index of the glass fiber and being in the range of from 1.540 to 1.570. The method further comprises injecting by injection molding a thermoplastic material on at least a portion of the part in a second shot. The thermoplastic material of the second shot adheres to at least a portion of the composition of the first shot.

In one embodiment, a molded article comprises: an insert comprising metal, glass, and combinations comprising at least one of the foregoing, and a composition comprising: a) an aromatic polycarbonate (PC) and poly(1,4-cyclohexane dimethylene 1,4-cyclohexanedicarboxylate) (PCCD), the weight ratio of PC to PCCD being in the range of 30 to 90 PC to 70 to 10 PCCD, b) glass fiber greater than or equal to ("≥") 0.75 mm in length and the quantity of glass fiber from 1 to 50 wt. % of the composition, and c) the refractive index of the polycarbonate and PCCD closely matching the refractive index of the glass fiber and being in the range of from 1.540 to 1.570, injection molded in a first shot on at least a portion of the insert forming a part. The molded article further comprises a thermoplastic material injection molded on at least a portion of the part in a second shot. The thermoplastic material of the second shot adheres to at least a portion of the composition of the first shot; and the molded article is configured to attach to an electronic device.

In another embodiment, a method for making a molded article comprises:
locating an insert comprising metal, glass, and combinations comprising at least one of the foregoing, in a tooling of a double shot injection molding apparatus; and injecting by injection molding, in a first shot on at least a portion of the insert to form a part, a composition comprising: a) a copolyestercarbonate and poly(1,4-cyclohexane dimethyl-1,4-cyclohexanedicarboxylate) (PCCD), the weight ration of copolyestercarbonate to PCCD in the range of 30 to 90 PC to 70 to 10 PCCD, b) glass fiber ≥0.75 mm in length and the quantity of glass fiber from 1 to 50 wt. % of the composition, and c) the refractive index of the copolyestercarbonate and PCCD closely matching the refractive index of the glass fiber and being in the range of from 1.508 to 1.585. The method further comprises injecting by injection molding a thermoplastic material on at least a portion of the part in a second shot. The thermoplastic material of the second shot adheres to at least a portion of the composition of the first shot.

In a further embodiment, a method for making a molded article comprises: locating an insert comprising metal, glass, and combinations comprising at least one of the foregoing, having a first coefficient of thermal expansion, in a tooling of a double shot injection molding apparatus; and injecting by injection molding a clear high modulus ductility thermoplastic material, having a second coefficient of thermal expansion, in a first shot on at least a portion of the insert to form a part. The method further comprises injecting by injection molding a glass fiber reinforced high modulus ductility thermoplastic material on at least a portion of the part in a second shot, wherein the coefficient of thermal expansion of the insert and the clear high modulus ductility thermoplastic material is within a range of 5 ppm/° C. to 80 ppm/° C. of each other. The clear high modulus ductility thermoplastic material comprises: a) an aromatic polycarbonate (PC) and poly(1,4-cyclohexane dimethylene 1,4-cyclohexanedicarboxylate) (PCCD), the weight ratio of PC to PCCD being in the range of 30 to 90 PC to 70 to 10 PCCD, b) glass fiber greater than or equal to 0.75 mm in length and the quantity of glass fiber from 1 to 50 wt. % of the composition, and c) the refractive index of the polycarbonate and PCCD closely matching the refractive index of the glass fiber and being in the range of 1.540 to 1.570.

In another embodiment, a system that facilitates securing one material to another material without cracking comprises: an insert comprising metal, glass, and combinations comprising at least one of the foregoing, and having a first coefficient of thermal expansion; and a thermoplastic part comprising a clear high modulus ductility thermoplastic material having a second coefficient of thermal expansion, wherein the thermoplastic part is injection molded to at least a portion of the insert by a first shot of a double shot injection molding process, and the coefficient of thermal expansion of the insert and the thermoplastic part is within a range of 5 ppm/° C. to 80 ppm/° C. of each other. The system further comprises a structure comprising a glass fiber reinforced high modulus ductility thermoplastic material injection molded and adhered to at least a portion of the thermoplastic part by a second shot of the double shot injection molding process.

In a further embodiment, a method for making a molded article comprises: locating an insert comprising metal, glass, and combinations comprising at least one of the foregoing, in a tooling of a double shot injection molding apparatus; and injecting by injection molding, in a first shot on at least a portion of the insert to form a part, a composition comprising: a) 55 to 95 mass % of an aromatic polycarbonate resin; b) 45 to 5 mass % of a glass filler having a refractive index, wherein the difference between the refractive index of the aromatic polycarbonate resin and the refractive index of the glass filler is 0.002 or less; c) 0.05 to 2.0 parts by mass of a silicon compound having a reactive functional group; and d) 0.03 to 0.4 parts by mass of an organic alkali metal salt compound, an organic alkaline earth metal salt compound, or a combination thereof, with respect to 100 parts by mass total. The method further comprises injecting by injection molding a thermoplastic material on at least a portion of the part in a second shot, wherein the thermoplastic material of the second shot adheres to at least a portion of the composition of the first shot.

In accordance with another embodiment, a method for making a molded article comprises: locating an insert comprising metal, glass, and combinations comprising at least one of the foregoing, in a tooling of a double shot injection molding apparatus; injecting by injection molding, in a first shot on at least a portion of the insert to form a part, a composition comprising at least one of a polycarbonate and a polyester; and injecting by injection molding a thermoplastic material on at least a portion of the part in a second shot. The thermoplastic material of the second shot adheres to at least a portion of the composition of the first shot. The insert has a first coefficient of thermal expansion and the composition of the first shot has a second coefficient of thermal expansion, the first coefficient of thermal expansion and the second coefficient of thermal expansion being within a range of 5 ppm/° C. to 80 ppm/° C. of each other.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1 is a depiction of an insert configured to be located in a tooling, according to one embodiment of a method for making a molded article.

FIG. 2A, FIG. 2B and FIG. 2C are a depiction of a double shot injection molding apparatus and tooling used in the first shot, and resultant enlarged portion, in accordance with an embodiment.

FIG. 3A, FIG. 3B and FIG. 3C are a depiction of layers of a molded article, in accordance with an embodiment, the molded article being configured for attachment to a mobile phone.

FIG. 6A and FIG. 6B are a portion of a double shot injection molding apparatus and tooling used in the second shot, and resultant enlarged portion, in accordance with an embodiment.

DETAILED DESCRIPTION

Figure 4:
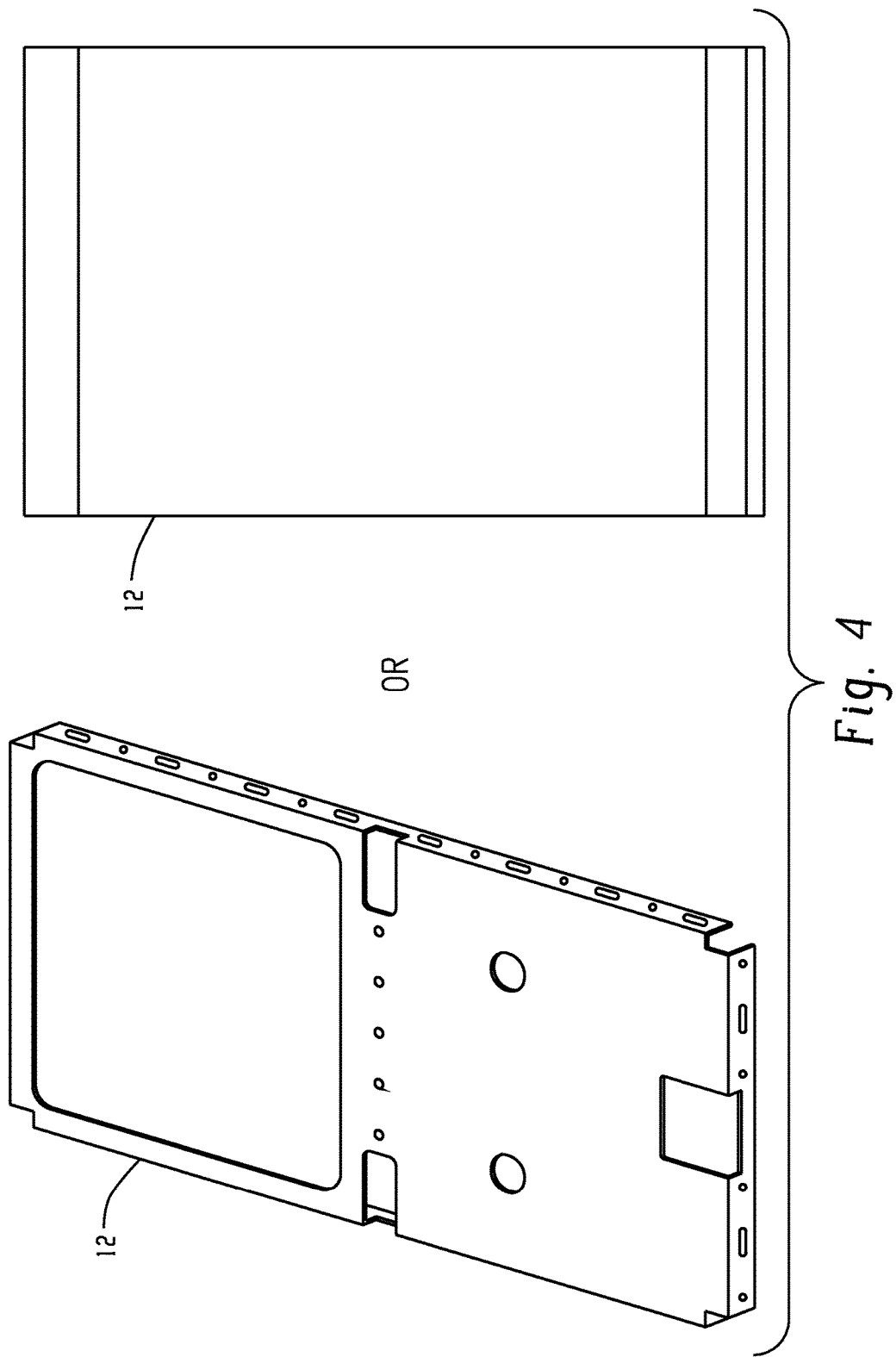
FIG. 4 is a depiction of an example of metal and a glass insert, in accordance with an embodiment.

According to an embodiment, the inventors have developed a molding process which effectively combines insert molding technology and 2K (double shot) molding technology in one process using specialized materials for the first shot and the second shot. As described in further detail below, the combination of a clear HMD (high modulus ductility) resin having a low CTE (coefficient of thermal expansion) for the first shot with a glass fiber reinforced HFD (bisphenol A-sebacic acid copolymer) resin, such as LEXAN* HFD resins sold by SABIC Innovative Plastics (formerly GE Plastics) for the second shot according to one embodiment can enable the fast, crack free production of molded articles, such as frames for mobile phones including bosses and snaps, with enhanced aesthetic and visual-fx effects including multi-colors. Advantageously, the material for the second shot could be the same clear HMD material as the material for the first shot, or could be a different material, and the second shot material adheres to at least a portion of the first shot material according to embodiments and as further described below.

To the inventors' knowledge, there is no effective, crack free application of metal and/or glass insert molding technology with 2K (double shot) molding technology, as described herein. A balance of CTE properties between the CTE of the insert and the CTE of the surrounding thermoplastic material for the first shot is needed, according to embodiments. More particularly, the inventors have found that the CTE's of these materials can be within a range of 5 ppm/° C. to 80 ppm/° C., more particularly, 5 ppm/° C. to 30 ppm/° C. of each other to help avoid cracking, according to embodiments. The inventors have further determined that the CTE shrinkage of a glass or metal sheet was different than that of plastic materials typically used in the first shot of conventional double shot injection molding processes for other applications, and the modulus of such materials was not enough.

The inventors have achieved a synergistic effect as a result of the combination of material properties used in this process, according to embodiments.

Accordingly, the inventors have determined that the success of a metal or glass insert can depend on the CTE difference between the insert and thermoplastic material injected around the insert during processing. The high modulus thermoplastic material used according to embodiments, clear HMD, exhibits a less CTE gap with metal and glass, which thus makes a resultant part more stable and less susceptible to cracking. The foregoing can make it possible to combine metal and glass insert molding technology with 2K (double shot) molding technology in one process to achieve an enhanced visual and aesthetic effect. According to embodiments, the inventors have determined how to, in one process, effectively correlate or match the lower CTE material of a glass or metal sheet insert with a low CTE and high modulus material (clear HMD) for the first shot to achieve an effective balance of properties which can prevent cracking and enable the use of 2K (double shot) injection molding, according to embodiments. This advancement satisfies a need in the industry.

Referring to FIG. 1 and according to one embodiment, to make a molded article 10, one example of which is shown in FIG. 3A, FIG. 3B and FIG. 3C and described below, an insert 12 can be located in a tooling 14. Tooling 14 can be a component of a double shot injection molding apparatus 16, an example of which is shown in FIG. 2A, FIG. 2B and FIG. 2C.

Molded article 10 can comprise any suitable molded article of desired shape, size, thickness and function. The processes disclosed herein according to embodiments are particularly useful for producing molded articles configured for attachment to, enclosing or covering electronic devices, such as portable electronic devices. Non-limiting examples of such portable devices include handheld computers, mobile phones, laptop computers, notebooks, tablet computers, media players, personal digital assistants, and so forth.

One example of a molded article 10 that can be produced by embodiments disclosed herein is shown in FIG. 3A, FIG. 3B and FIG. 3C depicting a molded article 10 configured for a touch screen mobile phone, which is described in further detail below. This molded article is shown in FIG. 3B as having dimensions of 100 mm by 60 mm, however, other suitable shapes and sizes are possible, according to embodiments.

Referring to FIGS. 1 through 3A, 3B and 3C, the insert 12 is exemplarily shown as a glass layer for the insert 12, which is particularly useful in mobile phone applications. Examples for a glass insert include, but are not limited to, one or more layers of glass as glass panels including glass display panels and glass touch screen panels, rectangular or other shaped, configured for mobile phones and other electronic devices. For example, the glass panel can be a liquid crystal diode (LCD) display, an organic light emitting diode (OLED) display, or other suitable display, with or without touch functionality integrated into the panel or provided as a separate touch pad. The glass panel for insert 12 thus can be of any suitable, shape, size and thickness.

Although insert 12 is shown as a glass insert in FIGS. 1 through 3A, 3B and 3C, which is particularly useful as a touch screen for a mobile phone, insert 12 also can be a metal layer. More particularly, insert 12 can be any suitable insert, such as a glass insert, metal insert, or combination thereof. For example, a metal sheet can be made of any suitable metal or combination of metals, including but not limited to, stainless steel, aluminum or iron, and in any suitable shape, size and thickness. As an example, insert 12 can comprise a 0.8 mm glass layer. As a further example, insert 12 also can be a combination of glass and metal such as a glass panel surrounded by a metal bezel or metal trim around the edges of the glass panel. One advantage of this embodiment is that color from the second shot can be deposited on the bezel to enhance the aesthetic and visual effects of a resultant molded article 10, such as the features of a mobile phone.

Insert 12 also can have the construction shown in FIG. 4. In particular, FIG. 4 shows an example of a suitable metal construction for insert 12, which provides stiffness to a resultant molded article 10, such as a mobile phone or other portable electronic device.

Figure 5:
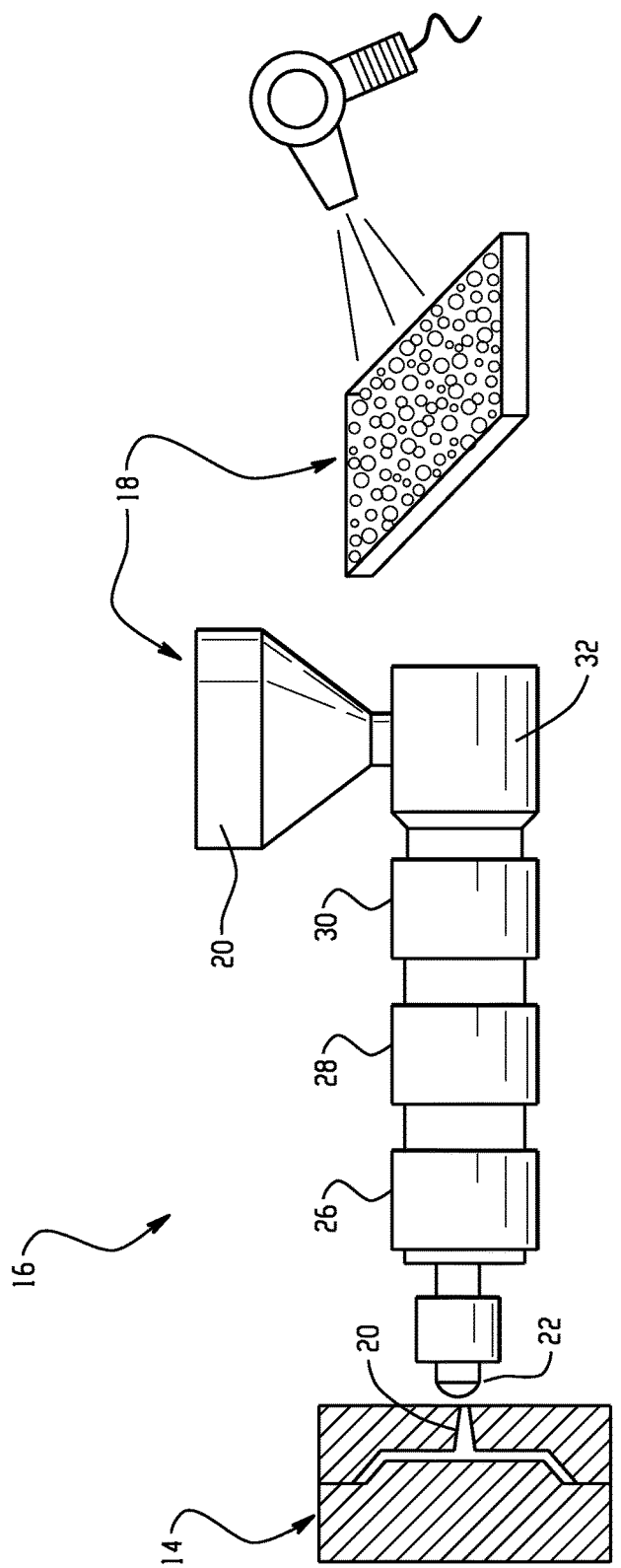
FIG. 5 is a depiction of a portion of a first shot of a double shot injection molding process, according to an embodiment.

The materials used for insert 12 can typically have a CTE of 5 ppm/° C. to 20 ppm/V. As described in further detail below, correlating the material properties of the insert 12 with the properties of the material used for the first shot can enable the crack free production of molded article 10. More particularly, the CTE of the insert can typically be 6 ppm/° C. to 20 ppm/° C., and more particularly 6 ppm/° C. to 18 ppm/° C. to correlate with the CTE of the material used for the first shot and help avoid cracking. As noted above, having the CTE's of the first material 18 of the first shot and the CTE of the insert 12 within a range of each other of 5 ppm/° C. to 80 ppm/° C., more particularly, within a range of 5 ppm/° C. to 30 ppm/° C. of each other can be effective to minimize the CTE difference between the materials and help avoid cracking, according to embodiments. Also, the CTE of the first material 18 can be 15 ppm/° C. to 30 ppm/° C. As shown in FIG. 2C, the insert 12 can be located in the tooling 14 of a double shot molding apparatus 16. Locating the insert 12 in the tooling 14 can be conducted manually by an operator of the apparatus 16 or the locating function can be automated, and the insert 12 can be held in place by a holding structure. Tooling 14, which is shown as a mold, for example, can be placed around insert 12 so that tooling 14 encloses insert 12 within a mold cavity. A first shot of first material 18 can be added to hopper 20, as shown in FIG. 5, in the form of pellets, which can be dried after production at, for example, 120° C. for 4 hours.

The first material 18 can be gravity feed into, for example, a screw-type portion of the double shot molding apparatus 16 that can be heated by a heater. The heat generated by the heater and rotation of a screw-type portion can cause the first material 18 to melt into a molten substance and flow toward the mold cavity. Tooling 14 can have an opening 20, as shown in FIG. 5, through which a nozzle 22 can be inserted to connect to the mold cavity. The now molten material (first material 18) can be injected at a pressure high enough so that the first material 18 can fill the mold. Examples of desired, approximate processing parameters for FIG. 5 are set forth below in Table 1.

TABLE 1

| Parameters (° C.) | Approx. | Actual |
|---|---|---|
| Nozzle cylinder 26 temperature | 300-310 | 300 |
| Front cylinder 28 temperature | 290-300 | 300 |
| Middle cylinder 30 temperature | 280-290 | 280 |
| Hopper cylinder 32 temperature | 270-280 | 275 |
| Tooling 14 temperature | 100-140 | 90-120 |
| Melt temperature | 280-310 | |

Referring to FIG. 2C, an enlarged portion is shown depicting material 18 formed around at least a portion of insert 12 in the tooling 14.

Cooling can be accomplished by running water through channels in the tooling 14 to cool the molten material 18. This material 18 that solidifies within the mold cavity forms a first part 24 of desired shape, size and thickness bonded to the insert 12 without cracking.

Referring to FIG. 3A and FIG. 3B, an example is shown of a first part 24, which comprises first material 18 molded in the shape of a frame surrounding the edges of the glass insert and bonded thereto. As noted above, the glass insert can be, for example, a glass display panel or touch screen panel.

In order to achieve a crack free bond between the aforedescribed insert 12 and the first material 18 injected during the first shot, the inventors have determined that first material 18 can be a specialized material comprising an optically clear polycarbonate (clear high modulus ductility material). One skilled in the art would recognize the difficulty in developing an optically clear polycarbonate including filler material. According to some embodiments, the clear HMD material can have a transmission ≥80%, and if the material includes color, the transmission could be less than 80%. Some parameters for embodiments of first material 18 are set forth below in Table 2. It is noted that in Table 2, "HMD" refers to high modulus ductility and "GF" refers to glass reinforced. "Trans. —2 mm" refers to transmission on a 2 millimeter (mm) plaque. According to embodiments, the transmission is measured according to ASTM D1003-00, procedure B, measured with instrument Macbeth 7000A, D65 illuminant, 10° observer, CIE (Commission Internationale de L'Eclairage) (1931), and SCI (specular component included). "Haze—2 mm" set forth in Table 2 refers to haze on a 2 mm plaque. According to embodiments, haze is measured in accordance with ASTM D-1003-00, Procedure A, measured, e.g., a HAZE-GUARD DUAL from BYK-Gardner, using an integrating sphere (0°/diffuse geometry), wherein the spectral sensitivity conforms to the CIE standard spectral value under standard lamp D65. "HDT" refers to heat deflection temperature measured in accordance with standard ASTM D 648. "FM" refers to flexure modulus measured in accordance with standard ASTM D 790. "TS" refers to tensile strength measured in accordance with standard ASTM D 638. "MVR" refers to melt volume flow rate measured in accordance with standard ASTM D 1238. "Izod" in Table 2 refers to notched izod impacted tested by ASTM D 256. Also, regarding shrinkage, ISO D2 plaques (60*60*2 mm) were employed as the test specimen. Mold shrinkage (parallel) refers to the dimensional difference between an injection molded thermoplastic test specimen and the tool from which it was molded, reported in percent (%) from measurements taken in a "with flow" direction at room temperature. Mold shrinkage (perpendicular) refers to the dimensional difference between an injection molded thermoplastic test specimen and the tool from which it was molded, reported in percent (%) from measurements taken in a "cross flow" (x) direction at room temperature. Table 2 also sets forth comparison parameters for another polycarbonate material (LEXAN* EXL1414 (unfilled) (commercially available from SABIC Innovative Plastics)).

TABLE 2

| Description | | HMD 10 wt. % GF | HMD 20 wt. % GF | HMD 30 wt. % GF | EXL1414 (Unfilled) |
|---|---|---|---|---|---|
| MVR-6 min., 300° C./1.2 kg | cm³/10 min | 9.34 | 8.49 | 8.83 | 10 |
| CTE | | | 2.2~3 E-5 1/° C. | | 7.2 E-5 1/° C. |
| Trans.-2 mm | % | 89.8 | 87.7 | 85.6 | / |
| Haze-2 mm | % | 9.6 | 20.9 | 29.1 | / |
| HDT-3.2 mm/1.82 Mpa | | 115 | 119 | 119 | 120 |
| FM | MPa | 3220 | 5250 | 7340 | 2230 |
| TS | MPa | 58.5 | 87.6 | 102 | 57 |
| Izod | J/m | 64.2 | 82 | 88.3 | 800 |
| Shrinkage-flow | % | 0.42 | 0.24 | 0.26 | 0.5~0.8 |
| Shrinkage-x-flow | % | 0.55 | 0.5 | 0.37 | 0.5~0.8 |

In accordance with one embodiment, the first material 18 of the first shot can comprise any and all compositions described in EP 1 734 076 A1. The compositions described in EP 1 734 076 A1 can exhibit increased clarity and transparency of glass fiber blends so as to enhance their colorability and surface appearance. The compositions can provide an effective platform for visual effects. High mechanical performance is maintained even though the polycarbonate quantity is reduced and the polyester is increased. The first material 18 can comprise a transparent or translucent composition comprising:

a. aromatic polycarbonate (PC) and poly(1,4-cyclohexane dimethylene 1,4-cyclohexanedicarboxylate) hereinafter referred to as (PCCD), the weight ratio of PC to PCCD in the range of 30 to 90 PC to 70 to 10 PCCD,
b. glass fiber ≥0.75 mm in length, the quantity of glass fiber from 1 to 50 wt. % of the composition,
c. the refractive index of the PC/PCCD mixture and the glass fiber matched between the range of 1.540 to 1.570.

It is noted that in the compositions disclosed herein for material 18 the weight ratio of polycarbonate to PCCD could be 55 to 75 PC to 45 to 25 PCCD, and more particularly, 60 to 90 PC to 40 to 10 PCCD, according to some embodiments.

An additional aspect for material 18 is a combination of copolyestercarbonate together with PCCD and glass fiber, the copolyester carbonate to PCCD weight ratio and the glass fiber minimum length, and wt. % being in the same ranges as previously disclosed except refractive index which is from 1.508 to 1.585. The ester in the copolyestercarbonate is desirably the residue of an aromatic dicarboxylic acid and a diol, for example, bisphenol-A. Specifically desirable is the ester bond from the residue of an aromatic dicarboxylic acid such as terephthalic acid and a diol such as resorcinol, e.g., 1,3-resorcinol.

Other materials could also be employed in material 18. For example, as described below, it is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer if desired for use in the preparation of the polycarbonate mixtures. Branched polycarbonates are also useful, such as described in U.S. Pat. No. 4,001,184, and there can be utilized blends of linear polycarbonate and a branched polycarbonate, as well as copolyestercarbonates employed in addition to or in replacement of polycarbonate. Moreover, as also described in further detail below, possible polyesters include poly(ethylene terephthalate) ("PET"), and poly(1,4-butylene terephthalate), ("PBT"), poly(ethylene napthanoate)("PEN"), poly(butylenes naphthanoate), ("PBN") and poly(propylene terephthalate)("PPT"), and mixtures thereof. Polyesters also include resins comprised of terephthalic acid, 1,4-cyclohexanedimethanol and ethylene glycol, for example, polycyclohexylendimethylene terephthalate glycol ("PCTG"), poly(ethylene terephthalate) glycol ("PETG"), poly(1,4-cyclohexylene-dimethylene terephthalate/isophthalae) ("PCTA"), polycyclohexylendimethylene terephthalate ("PCT") resins which are available from the Eastman Chemical Company. Polyesters can include minor amounts, e.g., from 0.5 to 5 percent by weight, of units derived from various aliphatic acid and/or aliphatic polyols to form copolyesters. The aliphatic polyols include glycols, such as poly(ethylene glycol) or poly(butylenes glycol). Such polyesters can be made following the teachings of, for example, U.S. Pat. Nos. 2,465,319 and 3,047,539. Moreover, as also described below, further additional resins that can be present are rubbery impact modifiers.

The aromatic polycarbonate employed, according to an embodiment, can be prepared by reacting a dihydric phenol with a carbonate precursor. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis(4-hydroxyphenyl)pentane; 2,4'-(dihydroxydiphenyl) methane; bis(2 hydroxyphenyl) methane; bis(4-hydroxyphenyl) methane; 1,1-bis(4-hydroxyphenyl)-3,3,5-trimethylcyclohexane; fluorenone bisphenol, 1,1-bis(4-hydroxyphenyl)ethane; 3,3-bis(4-hydroxyphenyl)pentane; 2,2-dihydroxydiphenyl; 2,6-dihydroxynaphthalene; his (4-hydroxydiphenyl)sulfone; bis (3,5-diethyl-4-hydroxyphenyl)sulfone; 2,2-bis(3,5-dimethyl-4-hydroxyphenyl)propane; 2,4'-dihydroxydiphenyl sulfone; 5'-chloro-2,4'-dihydroxydiphenyl sulfone; bis-(4-hydroxyphenyl)diphenyl sulfone; 4,4'-dihydroxydiphenyl ether; 4,4'-dihydroxy-3,3'-dichlorodiphenyl ether; 4,4-dihydroxy-2,5-diphenyl ether; and the like. Other dihydric phenols used in the preparation of the above polycarbonates are disclosed in U.S. Pat. Nos. 2,999,835; 3,038,365; 3,334,154; and 4,131,575.

Aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

As noted above, it is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures. Branched polycarbonates are also useful, such as are described in U.S. Pat. No. 4,001,184. Also, there can be utilized blends of linear polycarbonate and a branched polycarbonate. Moreover, blends of any of the above materials may be employed to provide the aromatic polycarbonate.

One aromatic carbonate is a homopolymer, e.g., a homopolymer derived from 2,2-bis(4-hydroxyphenyl)propane (bisphenol-A) and phosgene, commercially available under the trade designation LEXAN* (SABIC Innovative Plastics). LEXAN* EXL polycarbonate having the following formula

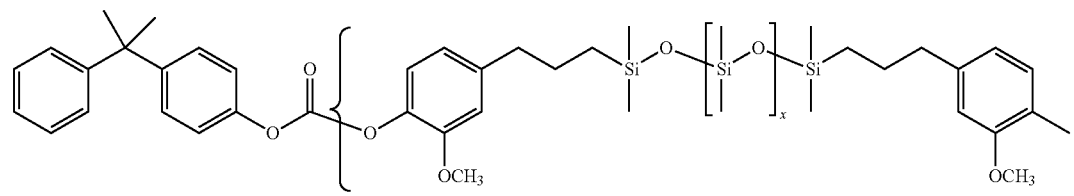

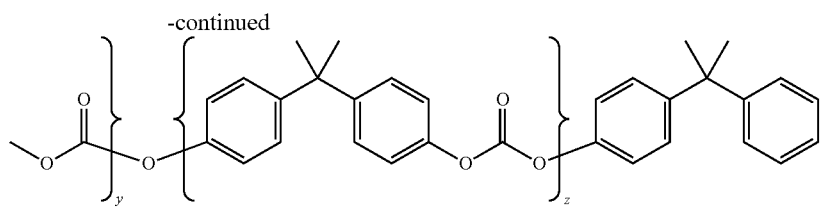

can be employed and also is commercially available from SABIC Innovative Plastics (formerly GE Plastics).

Branched polycarbonates are prepared by adding a branching agent during polymerization. These branching agents are well known and may comprise polyfunctional organic compounds containing at least three functional groups, which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid and benzophenone tetracarboxylic acid. The branching agent may be added at a level of 0.05 to 2.0 wt %, based upon the total weight of the components added during the polymerization of the polycarbonate. Branching agents and procedures for making branched polycarbonates are described in U.S. Pat. Nos. 3,635,895; 4,001,184; and 4,204,047.

The quantity of aromatic polycarbonate employed in the composition can be from 50 to 90 wt. % of the composition, particularly 60 to 90 wt. %.

Another example of an aromatic polycarbonate is bisphenol-A polycarbonate in a high or highest optical grade such as OQ1030, OQ3820, and the like, available from SABIC Innovative Plastics. This is an aromatic polycarbonate end capped with para cumyl phenol with a molecular weight determined by gas phase chromatography in methylene chloride of 17,000 to 37,000 and a refractive index of 1.586.

Copolyestercarbonates can also be employed in addition to or in replacement of polycarbonate. The ester bond can be supplied through the residue of a dicarboxylic acid, for example, aromatic, and a diol molecule such as bisphenol A or a resorcinol. More particularly, the ester bonds can be formed from an aromatic dicarboxylic acid, such as the residue of terephthalic acid, isophthalic acid or mixtures thereof and resorcinol, such as 1,3-resorcinol. Copolyestercarbonates with blocks of the ester groups are a particular example. Those molecules are well known in the polymer art. Examples of materials are disclosed in patents such as U.S. Pat. Nos. 6,559,270 and 6,627,303. These materials are sold through GE Advanced Materials as Sollx resins.

PCCD referred to above, which can be employed according to embodiments, is poly(1,4-cyclohexylenedimethylene 1,4-cyclohexanedicarboxylate) also sometimes referred to as poly(1,4-cyclohexenedimethanol-1,4-dicarboxylate) which has recurring units of the formula:

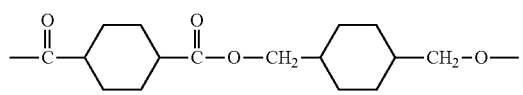

and modifications of PCCD with various diols or polytetrahydrofuran co-monomers.

The PCCD employed can be a standard PCCD available from Eastman Chemical. It has a molecular weight of 41,000 to 60,000 and a refractive index of 1.506 to 1.508.

The glass fiber which can be employed is any fiber and coating that satisfies the refractive index when combined with the resins employed. A standard E fiber can be used which has a refractive index of 1.558. In addition, glass fibers with other refractive indices can be used, such as non-alkali metal based borosilicate glass, alkali earth based borosilicate glass, alkali lead silicate glasses and glasses with high zirconia content.

Also, 1 to 50 wt. % of the composition can be glass fiber, more particularly 5 to 30 wt. %. A minimum length of the glass fiber is ≥0.75 mm, more specifically, ≥1.0 mm.

It is noted that this glass composite can be used in many applications, which require good mechanical properties combined with good optical and aesthetic properties. Examples of such applications include injection molding, film extrusion, and composite applications such as continuous fiber extrusion and pultrusion processes. Examples of such application types are found in U.S. Pat. Nos. 5,039,566 and 5,665,450.

In addition to the above components, other resins can be present. For examples, polyester resin components typically comprising structural units of the following formula can be present:

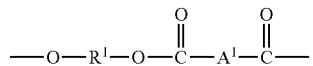

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-12}$ alkylene radical, a $C_{6-12}$ alicyclic radical, a $C_{6-20}$ aromatic radical or a polyoxyalkylene radical in which the alkylene groups contain 2-6 and most often 2 or 4 carbon atoms. The $A^1$ radical in the above formula is most often p- or m-phenylene, a cycloaliphatic or a mixture thereof. This class of polyester includes the poly(alkylene terephthalates) and the polyarylates. Such polyesters are known in the art as illustrated, for example, by the following U.S. patent Nos., which are incorporated herein by reference: U.S. Pat. Nos.

2,465,319; 2,720,502; 2,727,881; 2,822,348; 3,047,539; 3,671,487; 3,953,394 and 4,128,526.

Examples of aromatic dicarboxylic acids represented by the dicarboxylated residue $A^1$ are isophthalic or terephthalic acid, 1,2-di(p-carboxyphenyl)ethane, 4,4'-dicarboxydiphenyl ether, 4,4'bisbenzoic acid and mixtures thereof. Acids containing fused rings can also be present, such as in 1,4- 1,5- 2,7- or 2,6-naphthalenedicarboxylic acids. Some particular dicarboxylic acids are terephthalic acid, isophthalic acid, naphthalene dicarboxylic acid, cyclohexane dicarboxylic acid or mixtures thereof.

Polyesters include polyethylene terephthalate) ("PET"), and poly(1,4-butylene terephthalate), ("PBT"), poly(ethylene naphthanoate) ("PEN"), poly(butylene naphthanoate), ("PBN") and polypropylene terephthalate) ("PPT"), and mixtures thereof.

Polyesters also include resins comprised of terephthalic acid, 1,4-cyclohexanedimethanol and ethylene glycol, for example, polycyclohexylendimethylene terephthalate glycol ("PCTG"), poly(ethylene terephthalate)glycol ("PETG"), poly(1,4-cyclohexylene-dimethylene terephthalate/ isophthalae ("PCTA"), polycyclohexylendimethylene terephthalate ("PCT") resins, which are available from the Eastman Chemical Company.

Polyesters may include minor amounts, e.g., from 0.5 to 5 percent by weight, of units derived from various aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

Polyesters in this process can have an intrinsic viscosity of from 0.4 to 2.0 dl/g as measured in a 60:40 phenol/ tetrachloroethane mixture or similar solvent at 23° C.-30° C.

Recycled polyesters and blends of recycled polyesters with virgin polyester can be used.

An aromatic polyester such as a polyethylene terephthalate has an I.V. of 0.52 to 0.62 dl/g, specifically 0.54 to 0.60 as measured in a 60:40 phenol/tetrachloroethane mixture or similar solvent at 23-30° C.

Further additional resins that can be present are rubbery impact modifiers. The rubbery impact modifiers generally comprise an acrylic or methyacrylic grafted polymer with a conjugated diene or an acrylate elastomer, alone, or copolymerized with a vinyl aromatic compound. Particularly useful are the core-shell polymers of the type available from Rohm & Haas, for example, those sold under the trade designation Acryloid®. In general, these impact modifiers contain units derived from butadiene or isoprene, alone or in combination with a vinyl aromatic compound, or butyl acrylate, alone or in combination with a vinyl aromatic compound. The afore-mentioned impact modifiers are believed to be disclosed in Fromuth et. al., U.S. Pat. No. 4,180,494; Owens, U.S. Pat. No. 3,808,180; Farnham et al., U.S. Pat. No. 4,096,202; and Cohen et. al., U.S. Pat. No. 4,260,693. More particularly, the impact modifier can comprise a two-stage polymer having either a butadiene or butyl acrylate based rubbery core and a second stage polymerized from methyl-methacrylate alone, or in combination with styrene. Also present in the first stage are crosslinking and/or graftlinking monomers. Examples of the crosslinking monomers include 1,3-butylene diacrylate, divinyl benzene and butylenes dimethacrylate. Examples of graftlinking monomers are allyl acrylate, allyl methacrylate and diallyl maleate.

From an aesthetic standpoint, the use of color pigments for visual purposes should be noted. In general, the pigment may be a metallic-effect pigment, a metal oxide-coated metal pigment, a plate like graphite pigment, a plate like molybdenum disulfide pigment, a pearlescent mica pigment, a metal oxide-coated mica pigment, an organic effect pigment, a layered light interference pigment, a polymeric holographic pigment or a liquid crystal interference pigment. In an example, the pigment is a metal effect pigment selected from the group consisting of aluminum, gold, brass and copper metal effect pigments; especially aluminum metal effect pigments. Alternatively, effect pigments are pearlescent mica pigments or a large particle size, for example, platelet type, organic effect pigment selected from the group consisting of copper phthalocyanine blue, copper phthalocyanine green, carbazole dioxazine, diketopyrrolopyrrole, iminoisoindoline, iminoisoindolinone, azo and quinacridone effect pigments.

Examples of colored pigments especially include organic pigments selected from the group consisting of azo, azomethine, methine, anthraquinone, phthalocyanine, perinone, perylene, diketopyrrolopyrrole, thioindigo, dioxazine iminoisoindoline, dioxazine, iminoisoindolinone, quinacridone, flavanthrone, indanthrone, anthrapyrimidine and quinophthalone pigments, or a mixture or solid solution thereof; especially a dioxazine, diketopyrrolopyrrole, quinacridone, phthalocyanine, indanthrone or iminoisoindolinone pigment, or a mixture or solid solution thereof. Colored organic pigments of particular interest include C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, C.I. Pigment Green 36, or a mixture or solid solution thereof. Suitable colored pigments also include inorganic pigments; especially those selected from the group consisting of metal oxides, antimony yellow, lead chromate, lead chromate sulfate, lead molybdate, ultramarine blue, cobalt blue, manganese blue, chrome oxide green, hydrated chrome oxide green, cobalt green, and metal sulfides, such as cerium or cadmium sulfide, cadmium sulfoselenides, zinc ferrite, bismuth vanadate, and mixed metal oxides.

More particularly, the colored pigment can be a transparent organic pigment. Pigment compositions wherein the colored pigment is a transparent organic pigment having a particle size range of ≤0.2 μm, more specifically, ≤0.1 μm, are particularly interesting. For example, pigment compositions containing, as transparent organic pigment, the transparent quinacridones in their magenta and red colors, the transparent yellow pigments, like the isoindolinones or the yellow quinacridone/quinacridonequinone solid solutions, transparent copper phthalocyanine blue and halogenated copper phthalocyanine green, or the highly-saturated transparent diketopyrrolopyrrole or dioxazine pigments are particularly interesting. Typically the pigment composition is prepared by blending the pigment with the filler by known dry or wet mixing techniques. For example, the components are wet mixed in the end step of a pigment preparatory process, or by blending the filler into an aqueous pigment slurry, the slurry mixture is then filtered, dried and micropulverized.

The combination of resin and glass employed in these compositions permits the use of relatively high quantities of glass and PCCD while still maintaining very good mechanical properties, particularly impact resistance. The use of glass fiber above a certain minimum length, matched with the appropriate refractive index of the polymer system, seems to account for the outstanding balance of properties, particularly the maintenance of excellent mechanical properties such as modulus and impact strength. When glass fiber is below 0.75 mm in length and down to powder and flake size, generally below 0.2 mm, the composition can be deficient in modulus and strength for example tensile, flexural, and impact. Additionally the optical properties of the composition are not as strong, i.e. lower clarity.

Additionally, many other interesting effects are noted for these compositions. For example, the glass fiber in combination with the PC and PCCD provides significantly better optical properties for these transparent/translucent blends than the glass fiber with either the PC alone or the PCCD alone. The blend possesses better optical and impact strength than the blend without PCCD, particularly from the yellowness and transparency aspects.

Additional properties may be noted from the experiments below. In these experiments comparative examples are denoted by alphabet letters while the compositions described herein are denoted by arabic numerals.

The compositions are prepared by standard means employed in the art, for example the glass fiber being added downstream in the extruder or at the feedthroat.

The ingredients of the examples shown below in Tables 3-9, were tumble blended and then extruded on a 30 mm Werner Pfleiderer Single or Twin Screw Extruder with a vacuum vented mixing screw, at a barrel and die head temperature between 260-280° C. and 200-300 rpm screw speed. The extrudate was cooled through a water bath prior to pelletizing. Test parts were injection molded on a van Dorn molding machine with a set temperature of approximately 260-280° C. The pellets were dried under vacuum overnight prior to injection molding.

Tensile properties were tested on "dog bone"—150 mm×10 mm×4 mm (length×width×thickness) injection molded bars at room temperature with a crosshead speed of 5 mm/min for filled samples and 50 mm/min for unfilled samples using International Standards Organization ("ISO") method 527.

Flex properties were tested on 80 mm×10 mm×4 mm (length×width×thickness) injection molded bars at room temperature with a crosshead speed of 2 mm/min using ISO method 178.

Vicat properties (e.g., Vicat softening temperature) were measured on 10 mm×10 mm×4 mm (length×width×thickness) injection molded parts following ISO 306 using a heating rate of 120° C./hr.

The optical measurements, such as percent (%) transmission and haze were run on Haze-guard dual from BYK-Gardner via test ASTM D1003.

Color measurements were made on 100 mm diameter and 3.2 mm thickness injection molded parts using Color-Eye 7000 from Gretag Macbeth using standard ASTM D1003-00.

Flex plate (dynatup tests) were tested on 100 mm diameter and 3.2 mm thickness injection molded disks at room temperature using ISO method 130.

CTE measurements were conducted on 10 mm×10 mm×4 mm (length×width×thickness) injection molded parts and were conducted following ISO method 11359-2 on TMA-7 from Perkin Elmer.

Izod measurements were conducted on 10 mm×10 mm×4 mm (length×width×thickness) injection molded parts and were conducted following ISO 180 at room temperature using a pendulum of 5.5 joules (J).

Example 1

The following example (Table 3) illustrates the use of two blended homopolymers (PC & PCCD) providing better optical properties for the transparent composite blend versus the glass filled homopolymers. A dramatic increase in the transmission value and decrease in haze value is obtained when using a combination of PC & PCCD over a wide range of ratios versus just PC-glass or PCCD-glass.

TABLE 3

|  | A | B | C | 1 | 2 | 3 | 4 | 5 |
|---|---|---|---|---|---|---|---|---|
| PC wt. % | 70 | — | 65 | 30 | 38 | 45 | 56 | 65 |
| PCCD wt. % | 0 | 70 | 35 | 40 | 31 | 25 | 14 | 5 |
| Glass wt. % | 30 | 30 | — | 30 | 30 | 30 | 30 | 30 |
| Transmission % | 34 | 43 | 86 | 62 | 70 | 68 | 64 | 58 |

Example 2

The following example (Table 4) illustrates the PC-PCCD blend with glass has good mechanical properties like that of the PC-glass blend but possesses much better optical and impact properties. From a color standpoint, the blend is less "yellow" (lower 'b' value) and more "transparent" (higher 'L' value) compared to PC-glass.

TABLE 4

|  | D | 6 |
|---|---|---|
| PC wt. % | 90 | 58.5 |
| PCCD wt. % | — | 31.5 |
| Glass wt. % | 10 | 10 |
| Flexure Modulus (Mpa) | 3000 | 2900 |
| Transmission | 59.5 | 85.6 |
| Color-L | 85.7 | 95.7 |
| Color-b | 26.0 | 1.6 |
| Flex plate energy @ break (J) | 19.5 | 37.8 |

Example 3

The following example (Table 5) illustrates the PC-PCCD with glass has improved mechanical, heat and CTE properties relative to the blend without glass while still maintaining the optical properties.

TABLE 5

|  | E | 7 | 8 | 9 |
|---|---|---|---|---|
| PC wt. % | 65 | 58 | 52 | 45.5 |
| PCCD wt. % | 35 | 31 | 28 | 24.5 |
| Glass wt. % | — | 10 | 20 | 30 |
| Transmission % | 88 | 86 | 79 | 68 |
| Tensile MPa | 2000 | 3099 | 4688 | 7004 |
| Vicat degC. | 115 | 122 | 124 | 126 |
| CTE (20-80° C.) (*$10^{-5}$) | 8 | 6.46 | 4.51 | 3.64 |

Example 4

The following example (Table 6) illustrates the ITR (iso-terephthalic resorcinol) 20-PCCD blend with glass. ITR20 is the block copolyestercarbonate where the ester (block) content is 20 mol %. The block is the ester formed from terephthalic/isophthalic and 1,3-resorcinol. ITR20 is sold by SABIC Innovative Plastics (formerly GE Plastics) as Sollx. This blend has dramatically improved mechanical, heat and CTE properties relative to the blend without glass.

TABLE 6

|  | F | 10 |
| --- | --- | --- |
| ITR 20 wt. % | 60 | 54 |
| PCCD wt. % | 40 | 36 |
| Glass wt. % | — | 10 |
| Transmission % | 88 | 87 |
| Tensile Modulus (Mpa) | 1848 | 2920 |
| Vicat (deg. C.) | 108 | 114 |
| CTE (20-80° C.) (*$10^{-5}$) | 10.1 | 5.3 |

Example 5

The following example (Table 7) illustrates how the addition of another polyester (PCTG) to the PC-PCCD-glass blend can improve the impact properties while maintaining optical properties.

TABLE 7

|  | G | 11 | 12 |
| --- | --- | --- | --- |
| PC wt. % | 58.5 | 55 | 49 |
| PCCD wt. % | 31.5 | 30 | 27 |
| PCTG wt. % | — | 5 | 14 |
| Glass wt. % | 10 | 10 | 10 |
| Transmission | 85.4 | 85 | 85.4 |
| Unnotched Izod (kJ/m$^2$)* | 59.2 | 66.3 | 63.5 |
| Energy @ brk (J) | 37.8 | 49.1 | 43.8 |

*kJ/m$^2$ = kilojoules per square meter, unnotched mod impact tested by ISO 180

Example 6

The following example (Table 8) illustrates how the PC-PCCD-PCTG blend with glass has improved mechanical, and heat properties relative to the blend without glass while maintaining optical properties.

TABLE 8

|  | I | J | 14 | 15 |
| --- | --- | --- | --- | --- |
| PC/PCCD wt. % | 65/35 | 65/35 | 65/35 | 65/35 |
| PCTG-level wt. | 5 | 14 | 5 | 14 |
| Glass wt. % | — | — | 10 | 10 |
| Transmission | 86 | 86 | 85 | 85 |
| Tensile modulus (MPa) | 1953 | 1885 | 2947 | 3026 |
| Vicat (° C.) | 114.7 | 111.3 | 120.7 | 117.7 |

Example 7

The following example (Table 9) illustrates the importance of extruder design as optical and mechanical properties are improved for the glass filled composite when extruded in a single screw versus a twin-screw extruder.

TABLE 9

|  | H | 13 |
| --- | --- | --- |
| Extruder | Twin | Single |
| PC-level wt. % | 45 | 45 |
| Polyester-type | PCCD | PCCD |
| Polyester-level wt. % | 25 | 25 |
| Glass wt. % | 30 | 30 |
| Transmission | 61 | 68 |
| Tensile modulus (MPa) | 6792 | 7860 |
| Vicat (° C.) | 123.7 | 127.5 |

The foregoing details and examples demonstrate desirable properties and effective results of suitable compositions for first material 18 of the first shot, according to some embodiments. Also, as noted above in accordance with embodiments, the first material 18 can comprise a transparent or translucent composition. The transmission can depend on the matched color or color space and, for example if natural color is desired, then the transmission percent (%) for a transparent HMD material can be greater than or equal to 80% and 50% to less than 80% for translucent HMD material.

In accordance with further embodiments, the first material 18 could comprise a flame-retardant polycarbonate resin composition comprising an aromatic polycarbonate resin, a glass filler, a silicone compound, and an organic alkali metal salt compound and/or an organic alkaline earth metal salt compound. Such compositions are disclosed in U.S. Patent Publication No. 2010/0028640A1, the contents of which are hereby incorporated by reference. As one example, first material 18 of the first shot could comprise 55 to 95 mass % an aromatic polycarbonate resin; 45 to 5 mass % of a glass filler having a refractive index such that the difference between the refractive index of the aromatic polycarbonate resin and the refractive index of the glass filler is 0.002 or less; 0.05 to 2.0 parts by mass of a silicon compound having a reactive functional group; and 0.03 to 0.4 part by mass of an organic alkali metal salt compound, an organic alkaline earth metal salt compound, or a combination thereof, with respect to 100 parts by mass of the combination. This composition can be made as disclosed herein, and by conventional blending methods.

More specifically, material 18 could comprise a PC resin, bisphenol A polycarbonate having a viscosity average molecular weight of 19,000 (manufactured by Idemitsu Kosan Co., Ltd., trade name "TARFLON FN1900A"), refractive index 1.585, or other suitable PC resins as described herein.

Examples of glass fibers, according to embodiments, include: (a) glass fibers each including a chopped strand having a refractive index of 1.585 and a specific gravity of 2.69, and measuring Φ 13 μm×3 (manufactured by ASAHI FIBER GLASS Co., Ltd.), glass composition: $SiO_2$ 57.5 mass %, $Al_2O_3$ 12.0 mass %, CaO 21.0 mass %, ZnO 1.5 mass %, $TiO_2$ 5.0 mass %, MgO 2.5 mass %, ZnO 1.5 mass %, $Na_2+K_2O+LiO_2$=0.5 mass %; (b) glass milled fibers obtained by milling the glass fibers each including a chopped strand having a refractive index of 1.585 and a specific gravity of 2.69, and measuring Φ 13 μm×3 (manufactured by ASAHI FIBER GLASS Co., Ltd), glass composition same as in (a); (c) glass fibers each including a chopped strand which is made of E glass having a refractive index of 1.555 and a specific gravity of 2.54, and measuring Φ 13 μm×3 (manufactured by ASAHI FIBER GLASS Co., Ltd., trade name "03MA409C"), glass composition: $SiO_2$ 55.4 mass %, $Al_2O_3$ 14.1 mass %, CaO 23.2 mass %, $B_2O_3$ 6.0 mass %, MgO 0.4 mass %, $Na_2+K_2O+LiO_2$=0.7 mass %, Fe$_2$O$_3$ 0.2 mass %, F$_2$ 0.6 mass %. Other suitable glass fibers, as described herein could also be used.

Examples of silicone compounds having a reactive functional group include polyorganosiloxane polymers and/or copolymers, each having a basis structure represented by the general formula: R$^1_a$R$^2_b$SiO$_{(4-a-b)/2}$ where R$^1$ represents a reactive functional group. Examples of the functional group include an alkoxy group, an aryloxy group, a polyoxyalkylene group, a hydrogen group, a hydroxy group, a carboxyl group, a silanol group, an amino group, a mercapto group, an epoxy group, and a vinyl group. R$^2$ represents a hydrocarbon group having 1 to 12 carbon atoms. Examples include a linear or branched alkyl group having 1 to 12 carbon atoms, a cycloalkyl group having 5 to 12 carbon atoms, an aryl group having 6 to 12 carbon atoms, an aralkyl group having 7 to 12 carbon atoms. Specific examples include a methyl group, an ethyl group, an n-propyl group, an isopropyl group, various butyl groups, various pentyl groups, various hexyl groups, various octyl groups, a cyclopentyl group, a cyclohexyl group, a phenyl group, a tolyl group, a xylyl group, a benzyl group and a phenyl group. It is further noted that a and b represent a number satisfying relationships of 0<a≤b≤3, and 0<a+b≤3. When multiple R$^1$s are present, the multiple R$^1$s may be the same or different from one another, and when multiple R$^2$s are present, the multiple R$^2$s may be the same or different from one another.

According to embodiments, the composition can include flame retardant materials, such as (a) potassium perfluorobutane sulfonate (manufactured by DIC Corporation, trade name "Megafac F114"), (b) a 30% mass sodium polystyrene sulfonate aqueous solution having a weight average molecular weight of 20,000 and a sulfonation rate of 100% (manufactured by Shin-Etsu Chemical Co., Ltd, trade name "KR'219"); (c) a reactive silicone compound having a refractive index of 1.49 and having a vinyl group and a methoxy group as a functional group (manufactured by Dow Corning Toray Co., Ltd, trade name "DC3037"); and (d) polytetrafluoroethylene resin (manufactured by ASAHI Fluoropolymer, trade name "CD076"). As an example, a composition could comprise 0.05 to 0.5 parts by mass flame retardant materials, including 0.1, 0.2 and 0.3 parts by mass.

Examples of the organic alkali metal salt compound and/or the organic alkaline earth metal salt compound include, for instance, alkali metal salts or alkaline earth metal salts of an organic acid or organic ester having at least one carbon atom. Examples of organic acid and organic acid esters include organic acid ester including organic sulfonic acid, organic carboxylic acid, and polystyrene sulfonic acid. Examples of the alkali metal include sodium, potassium, lithium and cesium. Examples of the alkaline earth metal include magnesium, calcium, strontium and barium. Of those, the salt of sodium, potassium or cesium is particularly useful. The salt of the organic acid may be substituted by a halogen atom such as fluorine, chlorine, or bromine. Particularly useful is an alkali metal salt compound or alkaline earth metal salt compound of a perfluoroalkanesulfonic acid represented by: (C$_n$F$_{2n+1}$SO$_3$)$_m$M where n represents an integer of 1 to 10, M represents an alkali metal such as lithium, sodium, potassium, or cesium, or an alkaline earth metal such as magnesium, calcium, strontium, or barium, and m represents the valence of M. Moreover, other constituents as disclosed in U.S. Patent Publication No. 2010/0028640A1 also could be present.

It is noted that the above-described composition including the silicone compound, when molded, can have a total light transmission for visible light of 80% or more, a haze value of 40% or less, and a 60° specular gloss of 90 or more. The flame retardancy evaluation method in conformance with UL94 can also be 1.5 mmV–0.

A second shot of a material, second material 34, can then be injected on at least a portion of the first part 24, in a double shot molding apparatus as shown in FIG. 6A and FIG. 6B, to form a second part 36, which comprises second material 34, and is bonded to at least a portion of the first part 24, according to embodiments. The second shot can be injected under conditions described above with respect to the first shot.

According to embodiments, the second shot can inject a thermoplastic material that is the same material as the first material 18 for the first shot, as described above.

Alternatively, the second shot can inject a material that is different than the first material 18 for the first shot. However, the second material 34 should adhere to at least a portion of the first material 18 of the first shot, according to embodiments. More particularly, the adherency can be dependent upon the characteristics of the materials and sufficient to allow bonding without causing delamination. For example, the afore-described HMD material for the first shot according to embodiments can have an effective adherency with CYCLOY* C1200HF resin ((acrylonitrile butadiene styrene+PC) supplied by SABIC Innovative Plastics Europe) as a second material 34 of the second shot.

According to an embodiment, the second material 34 of the second shot can comprise any or all compositions as forth in EP 1 734 076 A1 and described above, and any combination of compositions disclosed in EP 1 734 076 A1 can be used for the first material 18 and the second material 34. Thus, the first material 18 of the first shot and the second material 34 of the second shot can each comprise a composition disclosed in EP 1 734 076 A1, and the compositions can thus be the same or different, according to embodiments. Thus, second material 34 could be any suitable plastic material compatible with the first material 18. An example of a suitable material for the second material 34 of the second shot is a glass fiber reinforced high modulus polycarbonate. LEXAN* glass fiber filled HFD polycarbonate copolymer resins sold by SABIC Innovative Plastics could be employed for second material 34 also are effective, and the glass fiber filled HFD material could be opaque, according to embodiments. The second material 34 also can comprise filled or unfilled thermoplastics or their blends. More particularly, second material 34 could include thermoset plastics and blends, pure polycarbonate, polycarbonate/acrylonitrile-butadiene-styrene (PC/ABS) blends and other PMMAs, polystyrene, nylon, filled and unfilled PC and polyester blends, filled and unfilled nylons. For example, suitable fillers include glass fibers, mineral fillers, and carbon fibers.

As second material 34 could be any suitable plastic material, the material could be selected from a wide variety of thermoplastic resins, blend of thermoplastic resins, thermosetting resins, or blends of thermoplastic resins with thermosetting resins, as well as combinations comprising at least one of the foregoing. The polymer could also be a blend of polymers, copolymers, terpolymers, or combinations comprising at least one of the foregoing. The polymer can also be an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at least one of the foregoing. Examples of the polymer could include polycarbonates, polystyrenes, polyesters (e.g., cycloaliphatic polyester, high molecular weight polymeric glycol terephthalates or isophthalates, and so forth), styrene acrylonitrile, acrylonitrile-butadiene-styrene (ABS), or the like, or a combination comprising at least one of the foregoing polymers.

Examples of fillers that could be employed in the afore-referenced materials include those described in "Plastic Additives Handbook, 4th Edition" R. Gachter and H. Muller (eds.), P. P. Klemchuck (assoc. ed.) Hansen Publishers, New York 1993. Non-limiting examples of fillers include silica powder, such as fused silica, crystalline silica, natural silica sand, and various silane-coated silicas; boron-nitride powder and boron-silicate powders; alumina and magnesium oxide (or magnesia); wollastonite including surface-treated wollastonite; calcium sulfate (as, for example, its anhydride, dihydrate or trihydrate); calcium carbonates including chalk, limestone, marble and synthetic, precipitated calcium carbonates, generally in the form of a ground particulate which often comprises 98+% $CaCO_3$ with the remainder being other inorganics such as magnesium carbonate, iron oxide and alumino-silicates; surface-treated calcium carbonates; talc, including fibrous, modular, needle shaped, and lamellar talcs; glass spheres, both hollow and solid, and surface-treated glass spheres typically having coupling agents such as silane coupling agents and/or containing a conductive coating; kaolin, including hard, soft, calcined kaolin, and kaolin comprising various coatings known to the art to facilitate the dispersion in and compatibility with the thermoset resin; mica, including metallized mica and mica surface treated with aminosilanes or acryloylsilanes coatings to impart good physicals to compounded blends; feldspar and nepheline syenite; silicate spheres; flue dust; cenospheres; fillite; aluminosilicate (armospheres), including silanized and metallized aluminosilicate; quartz; quartzite; perlite; Tripoli; diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; particulate or fibrous aluminum, bronze, zinc, copper and nickel; carbon black, including conductive carbon black; graphite, such as graphite powder; flaked fillers and reinforcements such as glass flakes, flaked silicon carbide, aluminum diboride, aluminum flakes, and steel flakes; processed mineral fibers such as those derived from blends comprising at least one of aluminum silicates, aluminum oxides, magnesium oxides, and calcium sulfate hemihydrate; natural fibers including wood flour, cellulose, cotton, sisal, jute, starch, cork flour, lignin, ground nut shells, corn, rice grain husks; synthetic reinforcing fibers, including polyester fibers such as polyethylene terephthalate fibers, polyvinylalcohol fibers, aromatic polyamide fibers, polybenzimidazole fibers, polyimide fibers, polyphenylene sulfide fibers, polyether ether ketone fibers, boron fibers, ceramic fibers such as silicon carbide, fibers from mixed oxides of aluminum, boron and silicon; single crystal fibers or "whiskers" including silicon carbide fibers, alumina fibers, boron carbide fibers, iron fibers, nickel fibers, copper fibers; glass fibers, including textile glass fibers such as E, A, C, ECR, R, S, D, and NE glasses, and quartz; vapor-grown carbon fibers include those having an average diameter of 3.5 to 500 nanometers as described in, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816,289 to Komatsu et al., U.S. Pat. No. 4,876,078 to Arakawa et al., U.S. Pat. No. 5,589,152 to Tennent et al., and U.S. Pat. No. 5,591,382 to Nahass et al.; and the like. When present, the fillers could be used in an amount of, for example, 1 to 50 weight percent of the total resin.

Figure 7A:
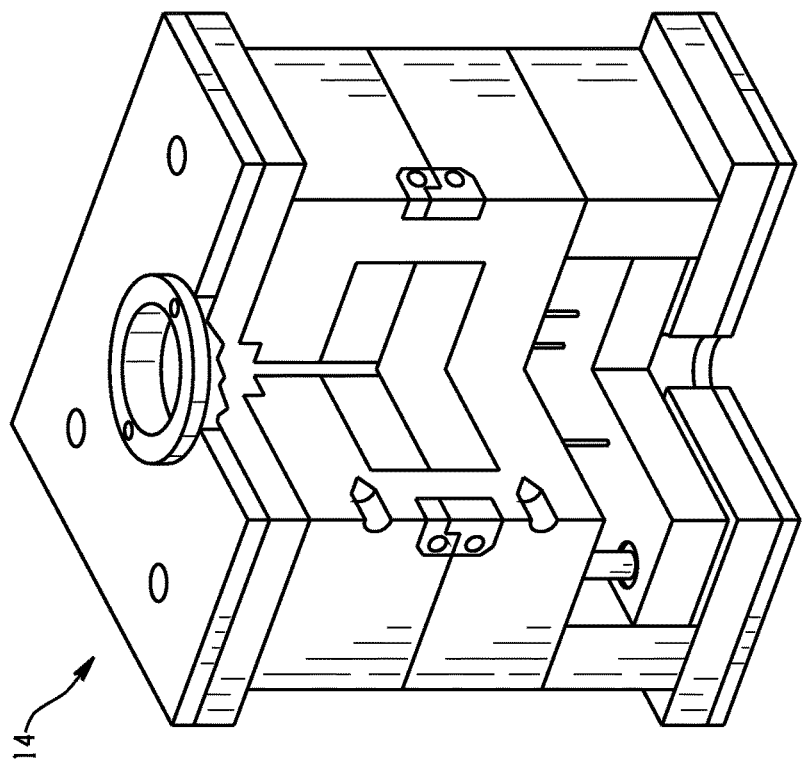
FIG. 7A and FIG. 7B are a schematic illustration of tooling and an enlarged portion showing a portion of the layers of a resultant molded article, according to an embodiment.
Figure 7B:
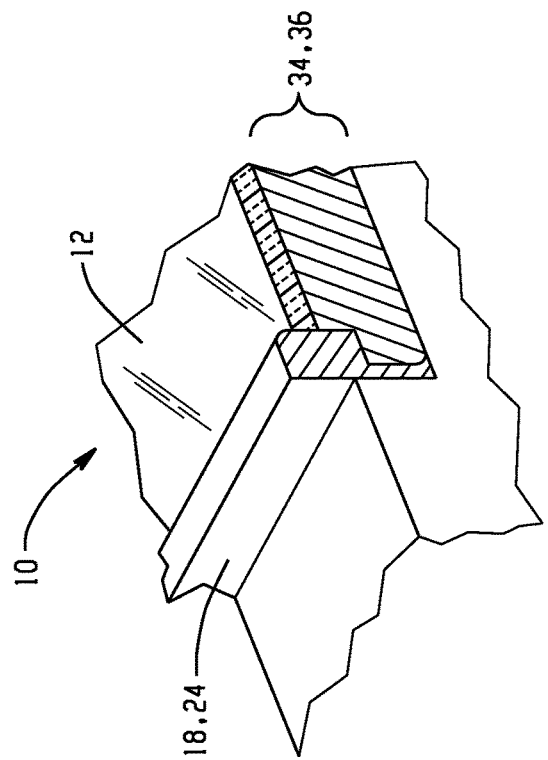

FIG. 7A and FIG. 7B are a depiction of tooling 14 including an enlarged section showing a portion of a resultant molded article 10. In FIG. 7B, insert 12 is shown as a glass or metal layer. First part 24 comprising first material 18 surrounds the edges of insert 12 as a first layer in this embodiment and forms a frame around the insert 12. Second part 36 comprising second material 34 is bonded to at least a portion of the first part 24 in a second layer. In this embodiment, the second part 36 also is bonded to at least a portion of the insert 12, as shown in FIG. 7B.

As shown in FIG. 3A, FIG. 3B and FIG. 3C, a molded article 10 configured to be attached to a front portion of a mobile phone, or other electronic device, can be produced according to embodiments. As shown in FIG. 3B, second part 36 can comprise attachment structures 38 for attaching to another portion of the mobile phone or other device, such as for attaching to a back housing (not shown). Attachment structures 38 can comprise any suitable attachments, such as bosses, snaps and so forth. As also shown in FIG. 3B, the second part 36 comprising second material 34 of the second shot can be located under the layer of the insert 12, for example, under a glass touch screen, and the first part 24 comprising the first material of the first shot can be located around the edges of both the insert 12 and the second part 36 thereby framing the molded article 10. Any attachment structures 38, such as bosses and/or snaps of the second part 36 can be employed to attach the molded article 10 to a portion of a mobile phone or other device, such as by attaching to a housing.

Advantageously, the second material 34 of the second shot can include color, which enhances the aesthetic and visual effect of the resultant molded article 10. For example, in view of FIG. 3A, FIG. 3B and FIG. 3C, one can appreciate the advantage of having a front portion of a mobile phone, or other electronic device, in a desired color.

Figure 8:
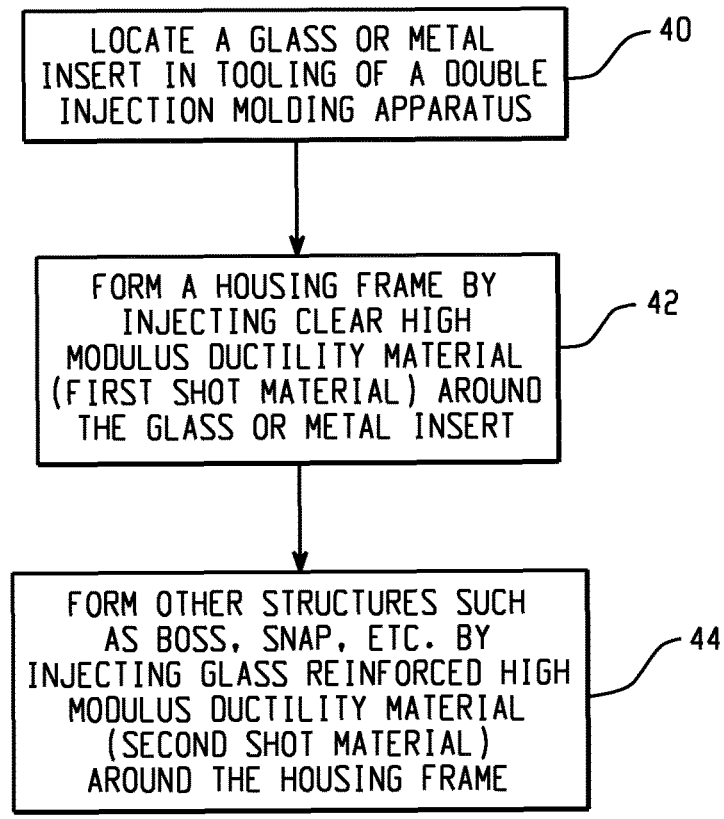
FIG. 8 is a flow chart of illustrative steps involved in forming a molded article in accordance with an embodiment.

FIG. 8 is a depiction of a flow chart of illustrative steps involved in forming a molded article 10 in accordance with one embodiment. As shown therein, at step 40 a glass or metal insert 12 can be located in a tooling 14 of a double shot molding apparatus 16. A frame, such as a housing frame, can be formed at step 42 by injecting clear high modulus ductility material (first material 18) as a first shot around the glass or metal insert 12. Other structures, such as a boss, snap and combinations thereof, and so forth, can be formed by injecting a glass fiber reinforced high modulus material (second material 34) as a second shot around the housing frame, as shown at step 44 of FIG. 8.

Figure 9B:
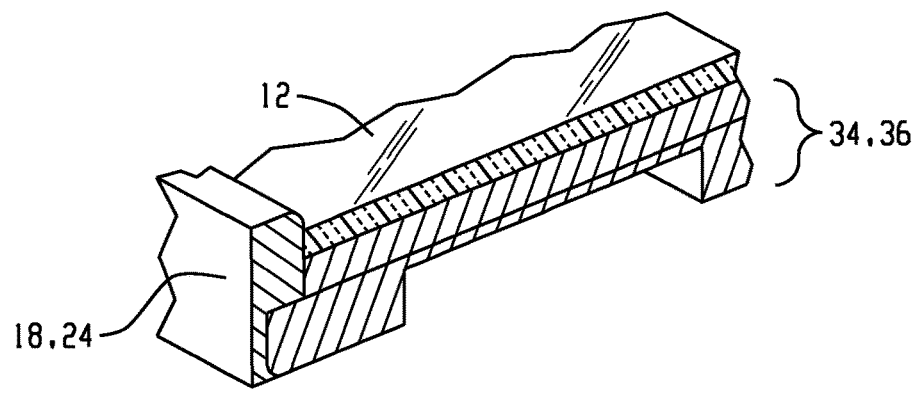
FIG. 9A and FIG. 9B are a schematic illustration depicting the first and second shot applications, according to an embodiment.
Figure 9A:
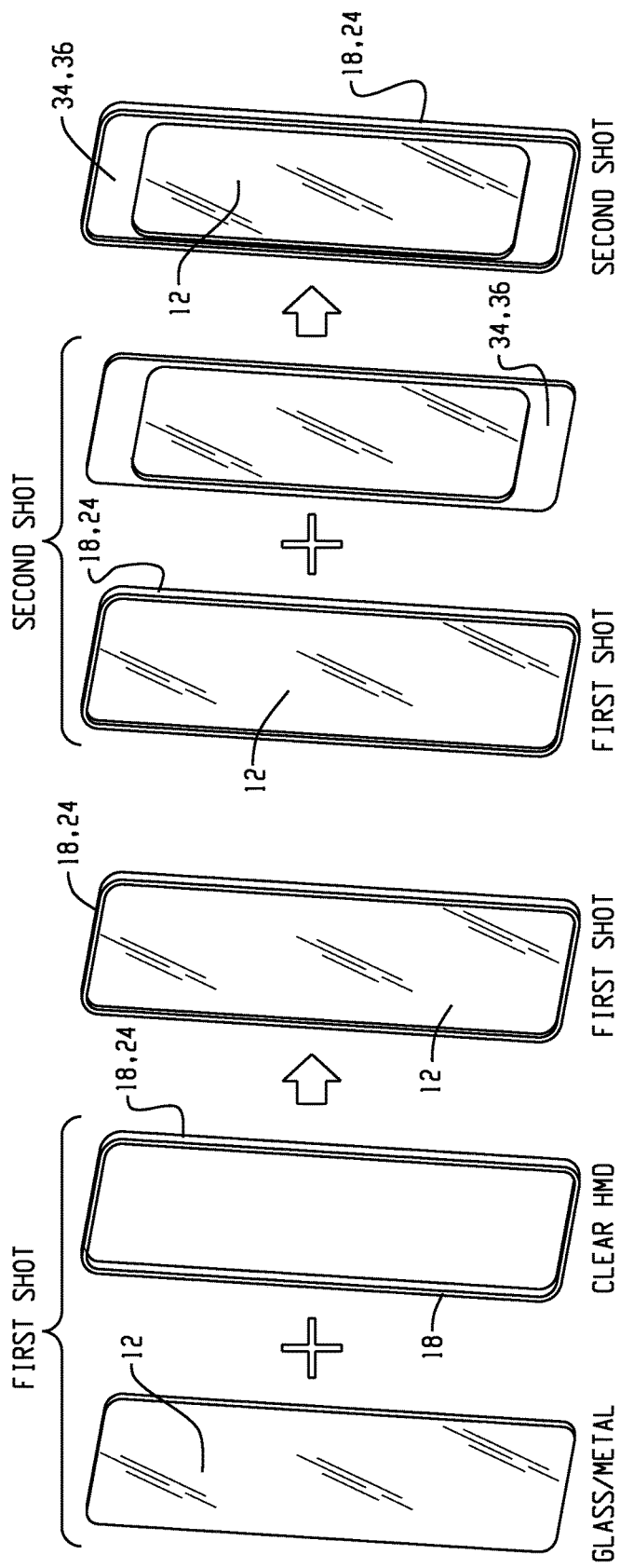

FIG. 9A and FIG. 9B schematically illustrate the first shot and second shot application for a mobile phone, in accordance with an embodiment. It is noted that while an example of a clear frame is shown in FIG. 9A and FIG. 9B, as well as in FIG. 3A and FIG. 3B (first part 24 comprising first shot material 18), other shapes and sizes of frames and other structures are contemplated by the embodiments disclosed herein for the first part 24, as well as for the other parts of molded article 10. Thus, the embodiments disclosed herein are not intended to be limited to the specific structure shown in any of the figures.

In one embodiment, a method for making a molded article comprises locating an insert comprising metal, glass, or a combination comprising at least one of the foregoing, in a tooling of a double shot injection molding apparatus. The method also comprises injecting by injection molding, in a first shot on at least a portion of the insert to form a part, a composition comprising a) an aromatic polycarbonate (PC) and poly(1,4-cyclohexane dimethylene 1,4-cyclohexanedicarboxylate) (PCCD), the weight ratio of PC to PCCD being in the range of 30 to 90 PC to 70 to 10 PCCD, b) glass fiber ≥0.75 mm in length and the quantity of glass fiber from 1 to 50 wt. % of the composition, and c) the refractive index of the polycarbonate and PCCD closely matching the refractive index of the glass fiber and being in the range of from 1.540 to 1.570. The method further comprises injection molding a thermoplastic material on at least a portion of the part in a second shot, wherein the thermoplastic material of the second shot adheres to at least a portion of the composition of the first shot.

In another embodiment a method for making a molded article comprises locating an insert comprising metal, glass, or combination comprising at least one of the foregoing, in a tooling of a double shot injection molding apparatus; injecting by injection molding, in a first shot on at least a portion of the insert to form a part, a composition comprising: a) a copolyestercarbonate and poly(1,4-cyclohexane dimethyl-1,4-cyclohexanedicarboxylate (PCCD), the weight ration of copolyestercarbonate to PCCD in the range of 30 to 90 PC to 70 to 10 PCCD, b) glass fiber ≥0.75 mm in length and the quantity of glass fiber from 1 to 50 wt. % of the composition, and c) the refractive index of the copolyestercarbonate and PCCD closely matching the refractive index of the glass fiber and being in the range of from 1.508 to 1.585. The method further comprises injection molding a thermoplastic material on at least a portion of the part in a second shot, wherein the thermoplastic material of the second shot adheres to at least a portion of the composition of the first shot.

In another embodiment, a method for making a molded article comprises locating an insert comprising metal, glass, or combination comprising at least one of the foregoing, having a first coefficient of thermal expansion, in a tooling of a double shot injection molding apparatus; injection molding a clear high modulus ductility thermoplastic material, having a second coefficient of thermal expansion, in a first shot on at least a portion of the insert to form a part; and injection molding a glass fiber reinforced high modulus ductility thermoplastic material on at least a portion of the part in a second shot. The coefficient of thermal expansion of the insert and the clear high modulus ductility thermoplastic material is within a range of 5 ppm/° C. to 80 ppm/° C. (0.5 E-05 to 8 E-05 l/° C.) of each other; and the clear high modulus ductility thermoplastic material comprises: a) an aromatic polycarbonate (PC) and poly(1,4-cyclohexane dimethylene 1,4 cyclohexanedicarboxylate) (PCCD), the weight ratio of PC to PCCD being in the range of 30 to 90 PC to 70 to 10 PCCD, b) glass fiber ≥0.75 mm in length and the quantity of glass fiber from 1 to 50 wt. % of the composition, and c) the refractive index of the polycarbonate and PCCD closely matching the refractive index of the glass fiber and being in the range of from 1.540 to 1.570.

In a further embodiment, a method for making a molded article comprises:

locating an insert comprising metal, glass, or combination comprising at least one of the foregoing, in a tooling of a double shot injection molding apparatus; injection molding, in a first shot on at least a portion of the insert to form a part, a composition comprising: a) 55 to 95 mass % of an aromatic polycarbonate resin; b) 45 to 5 mass % of a glass filler having a refractive index, wherein the difference between the refractive index of the aromatic polycarbonate resin and the refractive index of the glass filler is 0.002 or less; c) 0.05 to 2.0 parts by mass of a silicon compound having a reactive functional group; and d) 0.03 to 0.4 parts by mass of an organic alkali metal salt compound, an organic alkaline earth metal salt compound, or a combination thereof, with respect to 100 parts by mass total. The method further comprises injection molding a thermoplastic material on at least a portion of the part in a second shot, wherein the thermoplastic material of the second shot adheres to at least a portion of the composition of the first shot.

In a further embodiment, a method for making a molded article comprises: locating an insert comprising metal, glass, or combination comprising at least one of the foregoing, in a tooling of a double shot injection molding apparatus; injection molding, in a first shot on at least a portion of the insert to form a part, a composition comprising at least one of a polycarbonate and a polyester; and injection molding a thermoplastic material on at least a portion of the part in a second shot, wherein the thermoplastic material of the second shot adheres to at least a portion of the composition of the first shot. The insert has a first coefficient of thermal expansion and the composition of the first shot has a second coefficient of thermal expansion, the first coefficient of thermal expansion and the second coefficient of thermal expansion being within a range of 5 ppm/° C. to 80 ppm/° C. of each other.

In another embodiment, a molded article comprises: an insert comprising metal, glass, or combination comprising at least one of the foregoing; a composition comprising: a) an aromatic polycarbonate (PC) and poly(1,4-cyclohexane dimethylene 1,4-cyclohexanedicarboxylate) (PCCD), the weight ratio of PC to PCCD being in the range of 30 to 90 PC to 70 to 10 PCCD, b) glass fiber ≥0.75 mm in length and the quantity of glass fiber from 1 to 50 wt. % of the composition, and c) the refractive index of the polycarbonate and PCCD closely matching the refractive index of the glass fiber and being in the range of from 1.540 to 1.570, injection molded in a first shot on at least a portion of the insert forming a part; and a thermoplastic material injection molded on at least a portion of the part in a second shot of a double shot process, wherein the thermoplastic material of the second shot adheres to at least a portion of the composition of the first shot; and the molded article is configured to be attached to an electronic device.

In a further embodiment, a system that facilitates securing one material to another material without cracking, comprises: an insert comprising metal, glass, or combination comprising at least one of the foregoing, and having a first coefficient of thermal expansion; a thermoplastic part comprising a clear high modulus ductility thermoplastic material having a second coefficient of thermal expansion, wherein the thermoplastic part is injection molded to at least a portion of the insert by a first shot of a double shot injection molding process, and the coefficient of thermal expansion of the insert and the thermoplastic part is within a range of 5 ppm/° C. to 80 ppm/° C. of each other; and a structure comprising a thermoplastic material injection molded and adhered to at least a portion of the thermoplastic part by a second shot of the double shot injection molding process.

In the various embodiments of the systems, articles, and methods set forth above: (i) the weight ratio of polycarbonate to PCCD can be 60 to 90 PC to 40 to 10 PCCD; and/or (ii) glass fibers can be present in an amount of 5 to 30 weight percent; and/or (iii) the aromatic polycarbonate can comprise bisphenol-A-polycarbonate or a polycarbonate of formula

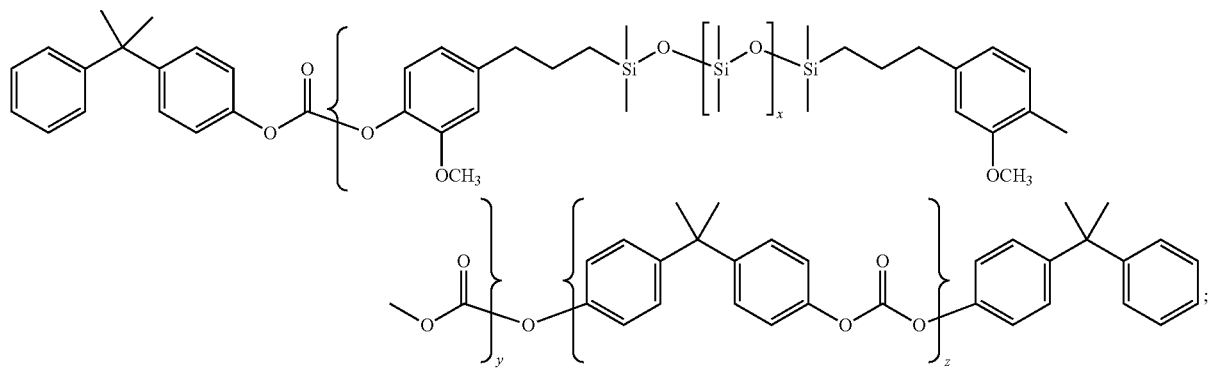

and/or (iv) the insert can comprise a glass panel configured for a portable electronic device; and/or (v) the portable electronic device can comprise at least one of a handheld computer, a mobile phone, a laptop computer, a tablet computer, a notebook, a media player, and a personal digital assistant; and/or vi) the portable electronic device can be a mobile phone and the glass panel has edges and comprises a glass mobile phone display or glass mobile phone touch panel; and/or vii) the glass panel comprises a bezel around the edges of the panel; and/or viii) the method can comprise injecting the composition of the first shot around the edges of the glass panel to form the part, which comprises a frame; and/or ix) the method can comprise injecting the thermoplastic material of the second shot on a portion of the frame to form an attachment structure; and/or x) the attachment structure can be selected from a boss, a snap, and combinations comprising at least one of the foregoing; and/or xi) the molded article can be configured to be mounted to another part of the mobile phone; and/or xii) the thermoplastic material of the second shot can comprise a glass fiber reinforced thermoplastic material; and/or xiii) the thermoplastic material of the second shot can comprise the same material as the composition of the first shot; and/or xiv) the molded article can be a multi-colored article; and/or xv) the insert can have a first coefficient of thermal expansion and the composition of the first shot has a second coefficient of thermal expansion, the first coefficient of thermal expansion and the second coefficient of thermal expansion being within a range of 5 ppm/° C. to 80 ppm/° C. of each other; and/or xvi) the insert can be a metal sheet; and/or xvii) the molded article can comprise a mobile phone frame; and/or xviii) the copolyestercarbonate can have ester bonds of the residue selected from the group consisting of terephthalic acid, isophthalic acid, and combinations comprising at least one of the foregoing, with 1,3-resorcinol; and/or xix) the ester groups can be in block form; and/or xx) the clear high modulus ductility thermoplastic material can comprise: a) an aromatic polycarbonate (PC) and poly(1,4-cyclohexane dimethylene 1,4-cyclohexanedicarboxylate) (PCCD), the weight ratio of PC to PCCD being in the range of 30 to 90 PC to 70 to 10 PCCD, b) the glass fiber ≥0.75 mm in length and the quantity of glass fiber from 1 to 50 wt. % of the composition, and c) the refractive index of the polycarbonate and PCCD closely matching the refractive index of the glass fiber and being in the range of 1.540 to 1.570; and/or xxi) the insert can comprise an inserted glass display panel or an inserted glass touch sensitive panel configured for a portable electronic device; and/or xxii) at least a portion of the structure can be a different color than the thermoplastic part; and/or xxiii) the thermoplastic part can comprise a frame configured for a mobile phone and the structure can comprise a boss, a snap, and combinations comprising at least one of the foregoing; and/or xxiv) the thermoplastic material of the second shot can comprise the same composition as the thermoplastic material of the first shot; and/or xxiv) the first coefficient of thermal expansion of the insert and the second coefficient of thermal expansion of the composition of the first shot can be within a range of 5 ppm/° C. to 80 ppm/° C. of each other; and/or xxv) the molded article can comprise a portion of a cover configured for a portable electronic device.

The terms "a" and "an" and "the" herein do not denote a limitation of quantity, and are to be construed to cover both the singular and the plural, unless otherwise indicated herein or clearly contradicted by context. Reference throughout the specification to "one embodiment", "another embodiment", "an embodiment" and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. The suffix "(s)" as used herein is intended to include both the singular and the plural of the term that it modifies, thereby including one or more of that term (e.g., the film(s) includes one or more films).

The term "polycarbonate" refers to an oligomer or polymer comprising repeat units derived from at least dihydroxy compounds and carbonate compounds. The term "polycarbonate" encompasses poly(carbonate-coester) oligomers and/or polymers. Nothing in the description and claims of this application should be taken as limiting the polycarbonate to only one monomer residue unless the context is expressly limiting. Thus, the application encompasses copolycarbonates with residues of 2, 3, 4, or more types of dihydroxy monomer compounds.

Also all ranges disclosed herein are inclusive of the endpoints, and the endpoints are independently combinable with each other.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A molded article, comprising:
an insert comprising metal, glass, and combinations comprising at least one of the foregoing;
a part comprising a composition injection molded in a first shot on at least a portion of the insert, the composition comprising:
   a) an aromatic polycarbonate (PC) and poly(1,4-cyclohexane dimethylene 1,4-cyclohexanedicarboxylate) (PCCD), a weight ratio of PC to PCCD being in the range of 30 to 90 PC to 70 to 10 PCCD,
   b) a glass fiber greater than or equal to 0.75 mm in length and a quantity of the glass fiber from 1 to 50 wt. % of the composition, and
   c) a refractive index of the aromatic polycarbonate and PCCD closely matching a refractive index of the glass fiber and being in the range of from 1.540 to 1.570; and
a thermoplastic material injection molded on at least a portion of the part in a second shot of a double shot process, wherein the thermoplastic material of the second shot adheres to at least a portion of the composition of the first shot; and the molded article is configured to be attached to an electronic device,
wherein the insert has a first coefficient of thermal expansion and the composition of the first shot has a second coefficient of thermal expansion, the first coefficient of thermal expansion and the second coefficient of thermal expansion is within a range of 5 ppm/° C. to 80 ppm/° C. of each other.

2. The molded article of claim 1, wherein the first coefficient of thermal expansion and the second coefficient of thermal expansion is within a range of 5 ppm/° C. to 30 ppm/° C. of each other.

3. The molded article of claim 2, comprising a mobile phone frame.

4. The molded article of claim 1, wherein the glass fiber is present from 5 to 30 weight percent.

5. The molded article of claim 1, wherein the insert comprises a glass panel configured for a portable electronic device.

6. The molded article of claim 1, wherein the electronic device comprises at least one of a handheld computer, a mobile phone, a laptop computer, a tablet computer, a notebook, a media player, and a personal digital assistant.

7. The molded article of claim 1, wherein the electronic device is a mobile phone and the insert comprises a glass panel that has edges and comprises a glass mobile phone display or glass mobile phone touch panel.

8. The molded article of claim 1, wherein the insert comprises a glass panel comprising a bezel around the edges of the glass panel.

9. The molded article of claim 1, wherein the weight ratio of PC to PCCD is 60 to 90 PC to 40 to 10 PCCD.

10. The molded article of claim 1, wherein a minimum length of the glass fiber is greater than or equal to 1.0 mm.

11. The molded article of claim 10, wherein the quantity of the glass fiber is from 5 to 30 wt. % of the composition.

12. The molded article of claim 10, wherein the first coefficient of thermal expansion and the second coefficient of thermal expansion is within a range of 5 ppm/° C. to 30 ppm/° C. of each other.

13. A system that facilitates securing one material to another material without cracking, comprising:
an insert comprising glass, metal, and combinations comprising at least one of the foregoing, and having a first coefficient of thermal expansion;
a clear high modulus ductility thermoplastic material having a second coefficient of thermal expansion, wherein the clear high modulus ductility thermoplastic material comprises:
   a) an aromatic polycarbonate (PC) and poly(1,4-cyclohexane dimethylene 1,4-cyclohexanedicarboxylate) (PCCD), a weight ratio of PC to PCCD being in the range of 30 to 90 PC to 70 to 10 PCCD,
   b) a glass fiber greater than or equal to 0.75 mm in length and a quantity of glass fiber from 1 to 50 wt. % of the clear high modulus ductility thermoplastic material, and
   c) a refractive index of the aromatic polycarbonate and PCCD closely matching a refractive index of the glass fiber and being in the range of from 1.540 to 1.570;
a thermoplastic part comprising the clear high modulus ductility thermoplastic material injection molded to at least a portion of the insert by a first shot of a double shot injection molding process, and the first coefficient of thermal expansion of the insert and the second coefficient of thermal expansion of the clear high modulus ductility thermoplastic material is within a range of 5 ppm/° C. to 80 ppm/° C. of each other; and
a structure comprising a thermoplastic material injection molded and adhered to at least a portion of the thermoplastic part by a second shot of the double shot injection molding process wherein the system is configured to be attached to an electronic device.

14. The system of claim 13, wherein at least a portion of the structure is a different color than the clear high modulus ductility thermoplastic material.

15. The system of claim 13, wherein the quantity of the glass fiber is from 5 to 30 wt. % of the clear high modulus ductility thermoplastic material.

16. The system of claim 13, wherein the minimum length of the glass fiber is greater than or equal to 1.0 mm.

17. The system of claim 13, wherein the first coefficient of thermal expansion and the second coefficient of thermal expansion is within a range of 5 ppm/° C. to 30 ppm/° C. of each other.

18. The system of claim 13, wherein the weight ratio of PC to PCCD is 60 to 90 PC to 40 to 10 PCCD.

19. A molded article, comprising:
an insert, wherein the insert comprises a glass panel configured for a portable electronic device;
a part comprising a composition injection molded in a first shot on at least a portion of the insert, the composition comprising:
   a) an aromatic polycarbonate (PC) and poly(1,4-cyclohexane dimethylene 1,4-cyclohexanedicarboxylate) (PCCD), a weight ratio of PC to PCCD being in the range of 60 to 90 PC to 40 to 10 PCCD,
   b) a glass fiber greater than or equal to 0.75 mm in length and a quantity of the glass fiber from 1 to 50 wt. % of the composition, and
   c) a refractive index of the aromatic polycarbonate and PCCD closely matching a refractive index of the glass fiber and being in the range of from 1.540 to 1.570; and
a thermoplastic material injection molded on at least a portion of the part in a second shot of a double shot process, wherein the thermoplastic material of the second shot adheres to at least a portion of the composition of the first shot; and the molded article is configured to be attached to an electronic device, wherein the insert has a first coefficient of thermal expansion and the composition of the first shot has a second coefficient of thermal expansion, the first coefficient of thermal expansion and the second coefficient of thermal expansion is within a range of 5 ppm/° C. to 80 ppm/° C. of each other.

20. The molded article of claim 19, wherein the length of the glass fiber is greater than or equal to 1.0 mm.

\* \* \* \* \*